United States Patent
Iwamoto et al.

(10) Patent No.: US 10,967,612 B2
(45) Date of Patent: Apr. 6, 2021

(54) INTERLAYER FOR LAMINATED GLASS, AND LAMINATED GLASS

(71) Applicant: SEKISUI CHEMICAL CO., LTD., Osaka (JP)

(72) Inventors: Tatsuya Iwamoto, Shiga (JP); Nami Minakuchi, Shiga (JP); Yuuma Takeda, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/455,355

(22) Filed: Mar. 10, 2017

(65) Prior Publication Data

US 2017/0182747 A1    Jun. 29, 2017

Related U.S. Application Data

(63) Continuation of application No. PCT/JP2015/075934, filed on Sep. 11, 2015, and a
(Continued)

(30) Foreign Application Priority Data

Sep. 12, 2014  (JP) .............................. JP2014-187077
Sep. 12, 2014  (JP) .............................. JP2014-187078
(Continued)

(51) Int. Cl.
*B32B 17/10*   (2006.01)
*B32B 7/022*   (2019.01)
(Continued)

(52) U.S. Cl.
CPC .......... *B32B 17/10761* (2013.01); *B32B 7/02* (2013.01); *B32B 7/022* (2019.01);
(Continued)

(58) Field of Classification Search
CPC .......... B32B 17/00–17/1099; B32B 7/00–7/14
See application file for complete search history.

(56) References Cited

U.S. PATENT DOCUMENTS 4,681,810 A    7/1987  Gomez
2004/0160688 A1    8/2004  Noguchi et al.
(Continued)

FOREIGN PATENT DOCUMENTS

CN    101124176 A    2/2008
CN    101460303 A    6/2009
(Continued)

OTHER PUBLICATIONS

Office Action issued in U.S. Appl. No. 15/455,457, dated May 3, 2018 (17 pages).
(Continued)

*Primary Examiner* — Prashant J Khatri
(74) *Attorney, Agent, or Firm* — Osha Bergman Watanabe & Burton LLP

(57) ABSTRACT

An interlayer film for laminated glass includes a first layer containing thermoplastic resin and silica particles; and a second layer containing a thermoplastic resin, wherein the first layer has tan δ of 0.8 or greater at 200° C., and wherein the second layer is disposed on a first surface side of the first layer, and has a glass transition temperature higher than a glass transition temperature of the first layer.

13 Claims, 4 Drawing Sheets

Related U.S. Application Data continuation of application No. PCT/JP2015/075937, filed on Sep. 11, 2015, and a continuation of application No. PCT/JP2015/075933, filed on Sep. 11, 2015, and a continuation of application No. PCT/JP2015/075936, filed on Sep. 11, 2015, and a continuation of application No. PCT/JP2015/075932, filed on Sep. 11, 2015, and a continuation of application No. PCT/JP2015/075938, filed on Sep. 11, 2015, and a continuation of application No. PCT/JP2015/075935, filed on Sep. 11, 2015.

(30) Foreign Application Priority Data

| Sep. 12, 2014 | (JP) | ............................ JP2014-187079 |
|---|---|---|
| Sep. 12, 2014 | (JP) | ............................ JP2014-187080 |
| Sep. 12, 2014 | (JP) | ............................ JP2014-187081 |
| Sep. 12, 2014 | (JP) | ............................ JP2014-187082 |
| Sep. 12, 2014 | (JP) | ............................ JP2014-187083 |

(51) Int. Cl.

| B32B 7/02 | (2019.01) |
|---|---|
| B32B 7/027 | (2019.01) |
| B32B 27/08 | (2006.01) |
| B32B 27/20 | (2006.01) |
| B32B 27/30 | (2006.01) |
| C03C 27/00 | (2006.01) |

(52) U.S. Cl.
CPC ........ *B32B 7/027* (2019.01); *B32B 17/10027* (2013.01); *B32B 17/10036* (2013.01); *B32B 17/10082* (2013.01); *B32B 17/10605* (2013.01); *B32B 17/10614* (2013.01); *B32B 17/10688* (2013.01); *B32B 17/10935* (2013.01); *B32B 27/08* (2013.01); *B32B 27/20* (2013.01); *B32B 27/30* (2013.01); *C03C 27/00* (2013.01); *B32B 2264/102* (2013.01); *B32B 2307/102* (2013.01); *B32B 2307/412* (2013.01); *B32B 2307/546* (2013.01); *B32B 2419/00* (2013.01); *B32B 2605/00* (2013.01); *B32B 2605/006* (2013.01)

(56) References Cited

U.S. PATENT DOCUMENTS

| 2005/0233547 | A1 | 10/2005 | Noda et al. |
|---|---|---|---|
| 2006/0210782 | A1 | 9/2006 | Lu |
| 2007/0231584 | A1 | 10/2007 | Hasegawa |
| 2007/0287786 | A1 | 12/2007 | Yuan |
| 2008/0124540 | A1 | 5/2008 | Yuan |
| 2008/0268270 | A1 | 10/2008 | Chen et al. |
| 2009/0311497 | A1 | 12/2009 | Aoki |
| 2010/0028642 | A1* | 2/2010 | Steuer ............... B32B 17/10761 428/220 |
| 2010/0124647 | A1 | 5/2010 | Keller et al. |
| 2010/0208349 | A1 | 8/2010 | Beer et al. |
| 2011/0287265 | A1 | 11/2011 | Hasegawa |
| 2012/0162752 | A1 | 6/2012 | Kitano et al. |
| 2012/0244329 | A1 | 9/2012 | Iwamoto et al. |
| 2012/0244364 | A1 | 9/2012 | Iwamoto et al. |
| 2012/0328843 | A1* | 12/2012 | Cleary ............... B32B 17/10036 428/174 |
| 2013/0183507 | A1 | 7/2013 | Matsuda et al. |
| 2013/0183532 | A1 | 7/2013 | Shimamoto et al. |
| 2013/0189528 | A1 | 7/2013 | Matsuda et al. |
| 2013/0202863 | A1 | 8/2013 | Shimamoto et al. |
| 2013/0224466 | A1 | 8/2013 | Fukatani et al. |
| 2013/0236711 | A1 | 9/2013 | Lu |
| 2013/0273379 | A1 | 10/2013 | Iwamoto et al. |
| 2013/0323516 | A1 | 12/2013 | Shimamoto et al. |
| 2013/0337247 | A1 | 12/2013 | Kitano et al. |
| 2014/0224423 | A1 | 8/2014 | Keller |
| 2016/0244590 | A1 | 8/2016 | Takada |

FOREIGN PATENT DOCUMENTS

| CN | 101678649 | A | 3/2010 |
|---|---|---|---|
| CN | 102686530 | A | 9/2012 |
| CN | 103140450 | A | 6/2013 |
| CN | 103153904 | A | 6/2013 |
| CN | 103391907 | A | 11/2013 |
| EP | 1977887 | A1 | 10/2008 |
| EP | 2848595 | A1 | 3/2015 |
| JP | 62-158037 | A | 7/1987 |
| JP | H02-22152 | A | 1/1990 |
| JP | H02229742 | A | 9/1990 |
| JP | H0797241 | A | 4/1995 |
| JP | 2001526165 | A | 12/2001 |
| JP | 2003-192402 | A | 7/2003 |
| JP | 2007070200 | A | 3/2007 |
| JP | 2008255226 | A | 10/2008 |
| JP | 2009540065 | A | 11/2009 |
| JP | 2010-523449 | A | 7/2010 |
| JP | 2010523449 | A | 7/2010 |
| JP | 2011-132120 | A | 7/2011 |
| JP | 2013-6724 | A | 1/2013 |
| JP | 2013-6725 | A | 1/2013 |
| JP | 2013-006728 | A | 1/2013 |
| JP | 2013-006729 | A | 1/2013 |
| JP | 2013-107821 | A | 6/2013 |
| JP | 2013107821 | A | 6/2013 |
| JP | 2014156390 | A | 8/2014 |
| TW | 201016459 | A | 5/2010 |
| WO | 9932283 | A1 | 7/1999 |
| WO | 2008122608 | A1 | 10/2008 |
| WO | 2012043816 | A1 | 4/2012 |
| WO | 2013168714 | A1 | 11/2013 |
| WO | 2013181484 | A1 | 12/2013 |
| WO | 2013188489 | A1 | 12/2013 |
| WO | 2014/126251 | A1 | 8/2014 |
| WO | 2015152241 | A1 | 10/2018 |

OTHER PUBLICATIONS

Office Action issued in U.S. Appl. No. 15/455,457, dated Oct. 6, 2017 (18 pages).
Extended European Search Report dated Mar. 20, 2018, issued in European Patent Application No. 15839510.3 (11 pages).
Extended European Search Report dated Mar. 20, 2018, issued in European Patent Application No. 15840765.0 (11 pages).
Extended European Search Report dated Mar. 20, 2018, issued in European Patent Application No. 15840754.4 (13 pages).
Extended European Search Report dated Mar. 20, 2018, issued in European Patent Application No. 15839712.5 (10 pages).
Extended European Search Report dated Mar. 22, 2018, issued in European Patent Application No. 15840071.3 (12 pages).
Extended European Search Report dated Mar. 20, 2018, issued in European Patent Application No. 15839981.6 (11 pages).
Extended European Search Report dated Mar. 20, 2018, issued in European Patent Application No. 15840260.2 (12 pages).
J. Ho et al; "Mesoporous silica spheres from colloids"; Journal of Colloid and Interface Science, vol. 308, pp. 374-380; 2007 (8 pages).
I. Ab Rahman et al; "Synthesis of Silica Nanoparticles by Sol-Gel: Size-Dependent Properties, Surface Modification, and Applications in Silica-Polymer Nanocomposites—A Review"; Journal of Nanomaterials, 2012 (16 pages).
H. S. Katz et al; "Handbook of Fillers for Plastics"; Van Nostrand Reinhold, 1987 (8 pages).
Database WPI, Week 200808, Oct. 18, 2007, Thomson Scientific, London, GB; AN 2008-B21371 and abstract of JP 2007-269880 (3 pages).
International Search Report issued in International Application No. PCT/JP2015/075932; dated Dec. 1, 2015 (2 pages).

(56) References Cited

OTHER PUBLICATIONS

International Search Report issued in International Application No. PCT/JP2015/075933; dated Dec. 1, 2015 (2 pages).
International Search Report issued in International Application No. PCT/JP2015/075934; dated Dec. 1, 2015 (2 pages).
International Search Report issued in International Application No. PCT/JP2015/075935; dated Dec. 1, 2015 (2 pages).
International Search Report issued in International Application No. PCT/JP2015/075936; dated Dec. 1, 2015 (2 pages).
International Search Report issued in International Application No. PCT/JP2015/075937; dated Dec. 1, 2015 (2 pages).
International Search Report issued in International Application No. PCT/JP2015/075938; dated Dec. 1, 2015 (2 pages).
International Preliminary Report on Patentability issued in International Application No. PCT/JP2015/075932; dated Mar. 16, 2017 (10 pages).
International Preliminary Report on Patentability issued in International Application No. PCT/JP2015/075936; dated Mar. 16, 2017 (10 pages).
International Preliminary Report on Patentability issued in International Application No. PCT/JP2015/075938; dated Mar. 16, 2017 (10 pages).
International Preliminary Report on Patentability and Written Opinion issued in International Application No. PCT/JP2015/075933; dated Mar. 23, 2017 (12 pages).
International Preliminary Report on Patentability and Written Opinion issued in International Application No. PCT/JP2015/075934; dated Mar. 23, 2017 (11 pages).
International Preliminary Report on Patentability and Written Opinion issued in International Application No. PCT/JP2015/075935; dated Mar. 23, 2017 (11 pages).
International Preliminary Report on Patentability and Written Opinion issued in International Application No. PCT/JP2015/075937; dated Mar. 23, 2017 (11 pages).
Office Action issued in U.S. Appl. No. 15/455,461, dated Jun. 28, 2018 (12 pages).
"Fumed Silica Product Information," Sigma-Aldrich, 2003 (3 pages).
Office Action issued in U.S. Appl. No. 15/455,293, dated Sep. 20, 2018 (10 pages).
Office Action issued in U.S. Appl. No. 15/455,323, dated Sep. 20, 2018 (8 pages).
Office Action issued in U.S. Appl. No. 15/455,457, dated Sep. 21, 2018 (26 pages).
Office Action issued in Chinese Application No. 201580049142.X, dated Oct. 8, 2018 (8 pages).
Office Action issued in Chinese Application No. 201580049119.0, dated Oct. 8, 2018 (8 pages).
Office Action issued in Chinese Application No. 201580045774.9, dated Oct. 29, 2018 (8 pages).
Office Action issued in Chinese Application No. 201580048937.9; dated Mar. 13, 2019 (16 pages).
Office Action issued in U.S. Appl. No. 15/455,323; dated Apr. 4, 2019 (11 pages).
Office Action issued in Chinese Application No. 201580049143.4, dated Jan. 3, 2019 (17 pages).
Office Action issued in Chinese Application No. 201580048844.6, dated Jan. 3, 2019 (21 pages).
Office Action issued in Chinese Application No. 201580048985.8, dated Jan. 3, 2019 (21 pages).
Opposition to Grant of Patent issued in Japanese Patent No. 6313781, dated Oct. 30, 2018 (53 pages).
Office Action issued in European Application No. 15840765.0, dated Jul. 29, 2019 (7 pages).
Office Action issued in European Application No. 15840754.4, dated Jul. 26, 2019 (5 pages).
Office Action issued in European Application No. 15839510.3, dated Jul. 26, 2019 (5 pages).
Office Action issued in European Application No. 15839712.5, dated Jul. 26, 2019 (5 pages).
Office Action issued in European Application No. 15840071.3, dated Jul. 26, 2019 (6 pages).
Office Action issued in European Application No. 15839981.6, dated Jul. 26, 2019 (5 pages).
Office Action issued in European Application No. 15840260.2, dated Jul. 26, 2019 (5 pages).
Office Action issued in Taiwanese Application No. 105108139, dated Jul. 29, 2019 (7 pages).
B. Shuguang et al., "Chinese New Material Development Almanac (2007-2008)", China Science and Technology Press, pp. 866 (7pages).
Office Action issued in Chinese Application No. 201580049119.0; dated May 13, 2019 (15 pages).
Office Action issued in Indian Application No. 201737004760, dated Aug. 29, 2019 (6 pages).
Office Action issued in Indian Application No. 201737004764, dated Aug. 21, 2019 (6 pages).
Office Action issued in Indian Application No. 201737004763, dated Aug. 28, 2019 (7 pages).
Office Action issued in Indian Application No. 201737004757, dated Sep. 19, 2019 (7 pages).
Office Action issued in Indian Application No. 201737004758, dated Aug. 29, 2019 (6 pages).
Office Action issued in Indian Application No. 201737004759, dated Aug. 28, 2019 (7 pages).
Office Action issued in Indian Application No. 201737004765, dated Sep. 19, 2019 (6 pages).
M. Fuji et al., "Surface properties of nanosize hollow silica particles on the molecular level," Advanced Powder Technol., vol. 18, No. 1, pp. 81-91, 2007 (11 pages).
Office Action issued in corresponding Tawainese Application No. 105108141; dated Jan. 30, 2020 (10 pages).
Office Action issued in U.S. Appl. No. 15/455,293; dated Feb. 3, 2020 (15 pages).
Office Action issued in U.S. Appl. No. 15/455,379; dated Dec. 27, 2019 (20 pages).
Office Action issued in U.S. Appl. No. 15/455,444; dated Dec. 27, 2019 (19 pages).
Ex Parte Quayle Action issued in corresponding U.S. Appl. No. 15/455,323; dated Feb. 6, 2020 (7 pages).
Office Action issued in European Application No. 15839510.3, dated Feb. 19, 2020 (5 pages).
Office Action issued in U.S. Appl. No. 15/455,457, dated Mar. 16, 2020 (13 pages).
Toyota Tsusho Corporation, "World First Sales of 'Heat Shielding and Thermal Insulating Film for Windows' Using Nanotechnology Material—Contributing towards the alleviation of electric power shortages, due to the earthquake-", Oct. 6, 2011 (3 pages).
Office Action issued in U.S. Appl. No. 15/455,444, dated Jul. 1, 2020 (12 pages).
M. Jafari et al. "Synthesis of antistatic hybrid nanocomposite coatings using surface modified indium tin oxide (ITO) nanoparticles", Journal of Coatings Technology and Research, (Jan. 2014); pp. 587-593 (7 pages).
Office Action issued in U.S. Appl. No. 15/455,293, dated Sep. 11, 2020 (17 pages).
Office Action issued in corresponding Japanese Application No. 2019-189349; dated Dec. 8, 2020 (8 pages).
Extended European Search Report dated Feb. 5, 2021, issued in European Patent Application No. 20207446.4 (10 pages).

\* cited by examiner

INTERLAYER FOR LAMINATED GLASS, AND LAMINATED GLASS

TECHNICAL FIELD

The present invention relates to an interlayer film for laminated glass used for obtaining laminated glass. Furthermore, the present invention relates to laminated glass including the interlayer film for laminated glass.

BACKGROUND ART

Laminated glass is excellently safe because it generates only a small amount of scattering glass fragments even when being subjected to external impact and is broken. Therefore, laminated glass is widely used in automobiles, railroad cars, airplanes, ships, buildings, and the like. Laminated glass is manufactured by interposing an interlayer film for laminated glass between two glass plates.

Interlayer films for laminated glass include a single-layered interlayer film having a structure consisting of a single layer and a multilayered interlayer film having a structure consisting of two or more layers.

The following Patent Literature 1 discloses, as an example of an interlayer film for laminated glass, a sound insulating layer containing 100 parts by weight of a polyvinyl acetal resin having a degree of acetalization of 60 to 85 mol %, 0.001 to 1.0 part by weight of at least one kind of metal salt among alkali metal salts and alkaline earth metal salts, and a plasticizer in an amount of greater than 30 parts by weight. This sound insulating layer alone can be used as an interlayer film.

The following Patent Literature 1 also describes a multi-layered interlayer film in which the aforementioned sound insulating layer and another layer are laminated. The other layer laminated on the sound insulating layer contains 100 parts by weight of a polyvinyl acetal resin having a degree of acetalization of 60 to 85 mol %, 0.001 to 1.0 part by weight of at least one kind of metal salt among alkali metal salts and alkaline earth metal salts, and a plasticizer in an amount of 30 parts by weight or less.

The following Patent Literature 2 discloses an interlayer film which is a polymer layer having a glass transition temperature of 33° C. or higher. Patent Literature 2 describes that the polymer layer is disposed between glass plates having a thickness of 4.0 mm or less.

The following Patent Literature 3 discloses an interlayer film containing (A) polyvinyl acetal, (B) at least one kind of plasticizer, (C) fumed silica, and (D) at least one kind of basic compound. In this interlayer film, a difference in refractive index between (C) fumed silica and plasticized polyvinyl acetal (A+B) is 0.015 or less, and a weight ratio of C/(A+B) is 2.7/100 to 60/100.

CITATION LIST

Patent Literature

[Patent Literature 1] JP-A-2007-070200
[Patent Literature 2] US 2013/0236711A1
[Patent Literature 3] WO 2008/122608A1

SUMMARY

Laminated glass including an interlayer film of the related art as described in Patent Literature 1 to 3 has low bending rigidity in some cases. Therefore, for example, in a case where the laminated glass is used in side doors of an automobile, because there is no frame for fixing the laminated glass, and the laminated glass bends due to low rigidity, it is difficult to open and close the glass in some cases.

In recent years, in order to lighten a laminated glass, the reduction of a thickness of a glass plate has been required. In laminated glass in which an interlayer film is interposed between two glass plates, in a case where the glass plate has a small thickness, it is extremely difficult to maintain bending rigidity at a sufficiently high level.

For example, even if the thickness of the glass plate is reduced, as long as the bending rigidity of the laminated glass can be improved due to the interlayer film, the laminated glass can be lightened. In a case where the laminated glass is light, an amount of materials used in the laminated glass can be reduced, and an environmental load can be reduced. Furthermore, in a case where light laminated glass is used in automobiles, fuel efficiency can be improved, and as a result, an environmental load can be reduced.

Patent Literature 3 describes the improvement of dynamic characteristics such as tensile strength. Generally, tensile strength is different from bending rigidity. In some cases, even if tensile strength can be improved to some extent, bending rigidity cannot be sufficiently improved.

For laminated glass including an interlayer film, in addition to high bending rigidity, excellent sound insulating properties are required. In Patent Literature 3, even though tensile strength can be improved, sound insulating properties cannot be sufficiently improved in some cases. Particularly, Patent Literature 3 does not state that, in a case where glass plates having a small thickness are combined with an interlayer film including a sound insulating layer having a low glass transition temperature, bending rigidity of the laminated glass becomes insufficient.

Patent Literature 3 describes the use of fumed silica (C) in a multilayered interlayer film. However, in the multilayered interlayer film using the fumed silica (C), streak-like irregularities occur on a surface of the interlayer film or in an interface between layers of the interlayer film in some cases. The streak-like irregularities are called flow marks.

One or more embodiments of the present invention provide an interlayer film for laminated glass that can improve bending rigidity and sound insulating properties of laminated glass and can inhibit the occurrence of flow marks. Furthermore, one or more embodiments of the present invention provide laminated glass including the aforementioned interlayer film for laminated glass.

According to one or more embodiments of the present invention, there is provided an interlayer film for laminated glass that includes a first layer containing a thermoplastic resin and a second layer containing a thermoplastic resin, in which the second layer is disposed on a first surface side of the first layer, the first layer contains silica particles, a glass transition temperature of the first layer is lower than a glass transition temperature of the second layer, and tan δ of the first layer at 200° C. is 0.8 or greater.

The thermoplastic resin in the first layer may be a polyvinyl acetal resin. A content ratio of hydroxyl groups of the polyvinyl acetal resin in the first layer may be 28 mol % or less. The thermoplastic resin in the second layer may be a polyvinyl acetal resin.

In a certain aspect of the interlayer film for laminated glass according to one or more embodiments of the present invention, an absolute value of a difference between the glass transition temperature of the first layer and the glass transition temperature of the second layer is 30° C. or higher.

In a certain aspect of the interlayer film for laminated glass according to one or more embodiments of the present invention, a glass transition temperature of the first layer is 15° C. or lower.

In a certain aspect of the interlayer film for laminated glass according to one or more embodiments of the present invention, a content of the silica particles in the first layer is 5 parts by weight to 64 parts by weight with respect to 100 parts by weight of the thermoplastic resin in the first layer.

In a certain aspect of the interlayer film for laminated glass according to one or more embodiments of the present invention, the interlayer film includes a third layer containing a thermoplastic resin, and the third layer is disposed on a second surface side of the first layer that is opposite to the first surface.

In a certain aspect of the interlayer film for laminated glass according to one or more embodiments of the present invention, each of the first layer, the second layer, and the third layer contains a plasticizer.

In a certain aspect of the interlayer film for laminated glass according to one or more embodiments of the present invention, provided that a thickness of the interlayer film for laminated glass is T, a thickness of the first layer is 0.4T or less.

In a certain aspect of the interlayer film for laminated glass according to one or more embodiments of the present invention, a thickness of the first layer is 200 μm or less.

In a certain aspect of the interlayer film for laminated glass according to one or more embodiments of the present invention, when laminated glass is obtained by interposing the interlayer film for laminated glass between two sheets of green glass having a thickness of 2 mm based on JIS R3208, a visible light transmittance of the obtained laminated glass is 70% or greater.

In a certain aspect of the interlayer film for laminated glass according to one or more embodiments of the present invention, the interlayer film is used with a first glass plate with a thickness equal to or less than 1 mm and arranged between the first glass plate and a second glass plate to be used for obtaining laminated glass.

According to one or more embodiments of the present invention, there is provided laminated glass including a first lamination glass member, a second lamination glass member, and the aforementioned interlayer film for laminated glass, in which the interlayer film for laminated glass is disposed between the first lamination glass member and the second lamination glass member.

In a certain aspect of the laminated glass according to one or more embodiments of the present invention, the first lamination glass member is a first glass plate, and a thickness of the first glass plate is 1 mm or less.

An interlayer film for laminated glass according to one or more embodiments of the present invention includes a first layer containing a thermoplastic resin and a second layer containing a thermoplastic resin, in which the second layer is disposed on a first surface side of the first layer, the first layer contains silica particles, a glass transition temperature of the first layer is lower than a glass transition temperature of the second layer, and tan δ of the first layer at 200° C. is 0.8 or greater. Therefore, bending rigidity of laminated glass including the interlayer film can be improved, sound insulating properties of the laminated glass can be improved, and the occurrence of flow marks in the laminated glass can be inhibited.

DESCRIPTION OF EMBODIMENTS

Figure 1:
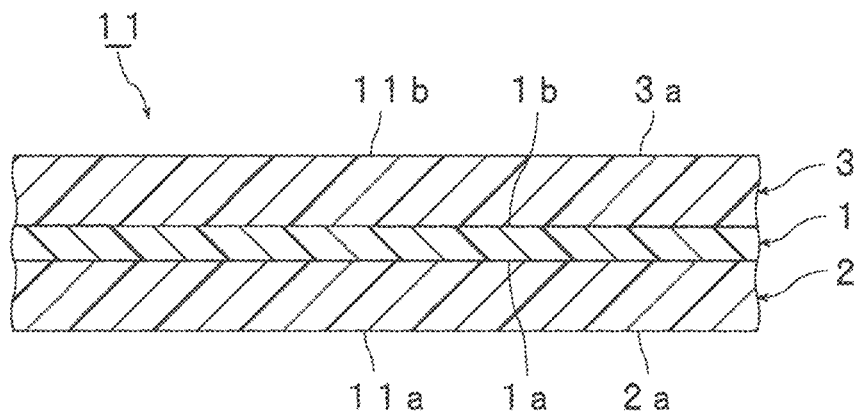
FIG. 1 is a sectional view schematically showing an interlayer film for laminated glass according to one or more embodiments of the present invention.

Hereinafter, one or more embodiments of the present invention will be specifically described.

An interlayer film for laminated glass (in the present specification, simply described as an "interlayer film" in some cases) according to one or more embodiments of the present invention has a structure consisting of two or more layers. The interlayer film according to one or more embodiments of the present invention may have a structure consisting of two layers or three or more layers. The interlayer film according to one or more embodiments of the present invention includes a first layer containing a thermoplastic resin and a second layer containing a thermoplastic resin. In the interlayer film according to one or more embodiments of the present invention, the second layer is disposed on a first surface side of the first layer.

In the interlayer film according to one or more embodiments of the present invention, the first layer contains silica particles.

In the interlayer film according to one or more embodiments of the present invention, a glass transition temperature of the first layer is lower than a glass transition temperature of the second layer.

In the interlayer film according to one or more embodiments of the present invention, tan δ of the first layer at 200° C. is 0.8 or greater.

Because of being constituted as above, the interlayer film according to one or more embodiments of the present invention can improve bending rigidity of laminated glass including the interlayer film. In order to obtain laminated glass, the interlayer film is disposed between a first glass plate and a second glass plate in many cases. Even though the first glass plate has a small thickness, in a case where the interlayer film according to one or more embodiments of the present invention is used, bending rigidity of the laminated glass can be sufficiently improved. Furthermore, even though both of the first and second glass plates have a small thickness, in a case where the interlayer film according to one or more embodiments of the present invention is used, bending rigidity of the laminated glass can be sufficiently improved. Herein, in a case where both of the first and second glass plates have a great thickness, bending rigidity of the laminated glass is further improved.

Furthermore, because of being constituted as above, the interlayer film according to one or more embodiments of the present invention can improve sound insulating properties of laminated glass including the interlayer film.

In addition, because the interlayer film according to one or more embodiments of the present invention is constituted as above, in the interlayer film, the occurrence of streak-like irregularities called flow marks can be inhibited. As a result, the appearance of laminated glass including the interlayer film can become excellent, distortion of an image transmitted through the laminated glass can be prevented, and hence the stress that an observer may experience due to the image can be alleviated.

The aforementioned interlayer film may have a structure consisting of three or more layers, and may include a third layer in addition to the first and second layers. The interlayer film may further include the third layer containing a thermoplastic resin. In a case where the interlayer film includes the second and third layers, the third layer is disposed on a second surface side of the first layer that is opposite to the first surface described above.

A surface of the aforementioned second layer that is opposite to the aforementioned first layer side may be a surface on which a lamination glass member or a glass plate is laminated. A thickness of the glass plate laminated on the second layer may be 1 mm or less. The second surface of the first layer that is opposite to the first surface (surface on the second layer side) may be a surface on which a lamination glass member or a glass plate is laminated. A thickness of the glass plate laminated on the first layer may be 1 mm or less. A surface of the third layer that is opposite to the first layer side may be a surface on which a lamination glass member or a glass plate is laminated. A thickness of the glass plate laminated on the third layer may be 1 mm or less.

Due to the interlayer film, bending rigidity can be sufficiently improved. Therefore, the interlayer film is suitably used for obtaining laminated glass by using a first glass plate having a thickness of 1 mm or less and disposing the interlayer film between the first glass plate and a second glass plate. Furthermore, due to the interlayer film, bending rigidity can be sufficiently improved. Accordingly, the interlayer film is more suitably used for obtaining laminated glass by using the first glass plate having a thickness of 1 mm or less and a second glass plate having a thickness of 1 mm or less and disposing the interlayer film between the first glass plate and the second glass plate.

Hereinafter, one or more embodiments of the present invention will be described with reference to drawings.

FIG. 1 is a sectional view schematically showing an interlayer film for laminated glass according to one or more embodiments of the present invention.

An interlayer film 11 shown in FIG. 1 is a multilayered interlayer film having a structure consisting of two or more layers. The interlayer film 11 is used for obtaining laminated glass. The interlayer film 11 is an interlayer film for laminated glass. The interlayer film 11 includes a first layer 1, a second layer 2, and a third layer 3. On a first surface 1a of the first layer 1, the second layer 2 is disposed and laminated. On a second surface 1b of the first layer 1 that is opposite to the first surface 1a, the third layer 3 is disposed and laminated. The first layer 1 is an intermediate layer. Each of the second layer 2 and the third layer 3 is a protective layer, and in examples of the present embodiment, each of the second layer 2 and the third layer 3 is a surface layer. The first layer 1 is disposed and interposed between the second layer 2 and the third layer 3. Accordingly, the interlayer film 11 has multilayer structure (second layer 2/first layer 1/third layer 3) in which the second layer 2, the first layer 1, and the third layer 3 are laminated in this order.

Between the second layer 2 and the first layer 1 and between the first layer 1 and the third layer 3, other layers may be disposed. The second layer 2 and the first layer 1 may be directly laminated on each other, and the first layer 1 and the third layer 3 may be directly laminated on each other. Examples of other layers include a layer containing polyethylene terephthalate and the like.

The first layer 1 contains a thermoplastic resin and silica particles. The second layer 2 contains a thermoplastic resin. The third layer 3 may contain a thermoplastic resin.

The interlayer film may include a first layer as a layer which is an intermediate layer in the interlayer film or a layer which is not a surface layer in the interlayer film. The interlayer film may include a second layer as a surface layer in the interlayer film. The interlayer film may include a third layer as a surface layer in the interlayer film.

Hereinafter, the first layer, the second layer, and the third layer constituting the interlayer film according to one or more embodiments of the present invention and each of the components contained in the first layer, the second layer, and the third layer will be specifically described.

(Thermoplastic Resin)

The aforementioned first layer contains a thermoplastic resin (hereinafter, described as a thermoplastic resin (1) in some cases). The first layer may contain, as the thermoplastic resin (1), a polyvinyl acetal resin (hereinafter, described as a polyvinyl acetal resin (1) in some cases). The aforementioned second layer contains a thermoplastic resin (hereinafter, described as a thermoplastic resin (2) in some cases). The second layer may contain, as the thermoplastic resin (2), a polyvinyl acetal resin (hereinafter, described as a polyvinyl acetal resin (2) in some cases). The aforementioned third layer may contain a thermoplastic resin (hereinafter, described as a thermoplastic resin (3) in some cases), and may contain, as the thermoplastic resin (3), a polyvinyl acetal resin (hereinafter, described as a polyvinyl acetal resin (3) in some cases). The thermoplastic resin (1), the thermoplastic resin (2), and the thermoplastic resin (3) may be the same as or different from each other. Therefore, it is possible that the thermoplastic resin (1) is different from the thermoplastic resin (2) and the thermoplastic resin (3), because then sound insulating properties are further improved. The polyvinyl acetal resin (1), the polyvinyl acetal resin (2), and the polyvinyl acetal (3) may be the same as or different from each other. Therefore, it is possible that the polyvinyl acetal resin (1) is different from the polyvinyl acetal resin (2) and the polyvinyl acetal resin (3), because then sound insulating properties are further improved. One kind of each of the thermoplastic resin (1), the thermoplastic resin (2), and the thermoplastic resin (3) may be used singly, or two or more kinds thereof may be used in combination. One kind of each of the polyvinyl acetal resin (1), the polyvinyl acetal resin (2), and the polyvinyl acetal resin (3) may be used singly, or two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may also be used.

The aforementioned polyvinyl acetal resin can be manufactured by, for example, acetalizing polyvinyl alcohol by using aldehyde. The polyvinyl acetal resin may be an acetalization product of polyvinyl alcohol. The polyvinyl alcohol is obtained by, for example, saponifying polyvinyl acetate. A degree of saponification of the polyvinyl alcohol is generally 70 to 99.9 mol %.

An average degree of polymerization of the aforementioned polyvinyl alcohol (PVA) may be 200 or greater, 500 or greater, 1,500 or greater, 1,600 or greater, 2,600 or greater, or 2,700 or greater. The average degree of polymerization of the polyvinyl alcohol may be 5,000 or less, 4,000 or less, or 3,500 or less. In a case where the average degree of polymerization is equal to or greater than the aforementioned lower limit, penetration resistance of laminated glass is further improved. In a case where the average degree of polymerization is equal to or less than the aforementioned upper limit, an interlayer film is easily formed.

The average degree of polymerization of the polyvinyl alcohol is determined by a method based on JIS K6726 "Testing methods for polyvinyl alcohol".

The number of carbon atoms of an acetal group in the aforementioned polyvinyl acetal resin may be 3 to 5, for example 4 or 5.

As the aforementioned aldehyde, generally, aldehyde having 1 to 10 carbon atoms is suitably used. Examples of the aldehyde having 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Among these, acetaldehyde, propionaldehyde, n-butyraldehyde, isobutyraldehyde, n-hexylaldehyde, or n-valeraldehyde may be used, acetaldehyde, propionaldehyde, n-butyraldehyde, isobutyraldehyde, or n-valeraldehyde may be used, and n-butyraldehyde or n-valeraldehyde may be used. One kind of the aldehyde may be used singly, or two or more kinds thereof may be used in combination.

The content ratio of hydroxyl groups (amount of hydroxyl group) of the polyvinyl acetal resin (1) may be 17 mol % or greater, 20 mol % or greater, or 22 mol % or greater. The content ratio of hydroxyl groups may be 28 mol % or less, 27 mol % or less, 25 mol % or less, or 24 mol % or less. In a case where the content ratio of hydroxyl groups is equal to or greater than the aforementioned lower limit, mechanical strength of the interlayer film is further improved. Particularly, in a case where the content ratio of hydroxyl groups of the polyvinyl acetal resin (1) is 20 mol % or greater, reaction efficiency becomes high, and productivity becomes excellent. In a case where the content ratio of hydroxyl groups is 28 mol % or less, sound insulating properties of the laminated glass are further improved. In a case where the content ratio of hydroxyl groups is equal to or less than the aforementioned upper limit, flexibility of the interlayer film is improved, and handling of the interlayer film becomes easy. Particularly, although laminated glass including the interlayer film, in which the content ratio of hydroxyl groups of the polyvinyl acetal resin (1) is 28 mol % or less, tends to have low bending rigidity, in a case where the aforementioned first layer contains silica particles, bending rigidity can be markedly improved.

A content ratio of hydroxyl groups of each of the polyvinyl acetal resin (2) and the polyvinyl acetal resin (3) may be 25 mol % or greater, 28 mol % or greater, 30 mol % or greater, 31.5 mol % or greater, 32 mol % or greater, or 33 mol % or greater. The content ratio of hydroxyl groups may be 38 mol % or less, 37 mol % or less, 36.5 mol % or less, or 36 mol % or less. In a case where the content ratio of hydroxyl groups is equal to or greater than the aforementioned lower limit, bending rigidity is further improved, and adhesion of the interlayer film is further improved. In a case where the content ratio of hydroxyl groups is equal to or less than the aforementioned upper limit, flexibility of the interlayer film is improved, and handling of the interlayer film becomes easy.

From the viewpoint of further improving sound insulating properties, the content ratio of hydroxyl groups of the polyvinyl acetal resin (1) may be lower than the content ratio of hydroxyl groups of the polyvinyl acetal resin (2). In addition, from the viewpoint of further improving sound insulating properties, the content ratio of hydroxyl groups of the polyvinyl acetal resin (1) may be lower than the content ratio of hydroxyl groups of the polyvinyl acetal resin (3). Moreover, from the viewpoint of further improving sound insulating properties, each of an absolute value of a difference between the content ratio of hydroxyl groups of the polyvinyl acetal resin (1) and the content ratio of hydroxyl groups of the polyvinyl acetal resin (2) and an absolute value of a difference between the content ratio of hydroxyl groups of the polyvinyl acetal resin (1) and the content ratio of hydroxyl groups of the polyvinyl acetal resin (3) may be 1 mol % or greater, 5 mol % or greater, 9 mol % or greater, 10 mol % or greater, or 12 mol % or greater. Each of the absolute value of the difference between the content ratio of hydroxyl groups of the polyvinyl acetal resin (1) and the content ratio of hydroxyl groups of the polyvinyl acetal resin (2) and the absolute value of the difference between the content ratio of hydroxyl groups of the polyvinyl acetal resin (1) and the content ratio of hydroxyl groups of the polyvinyl acetal resin (3) may be 20 mol % or less. In a case where silica particles are used, sound insulating properties tend to be further reduced due to the influence of silica particles, than in a case where silica particles are not used. However, in a case where the relationship of the content ratio of hydroxyl groups described above is satisfied, sound insulating properties can be effectively improved.

The content ratio of hydroxyl groups of the polyvinyl acetal resin is a value obtained by expressing a molar fraction, which is determined by dividing an amount of ethylene groups to which hydroxyl groups are bonded by a total amount of ethylene groups on a main chain, as a percentage. The amount of ethylene groups to which hydroxyl groups are bonded can be measured based on, for example, JIS K6728 "Testing methods for polyvinyl butyral".

A degree of acetylation (amount of acetyl group) of the polyvinyl acetal resin (1) may be 0.01 mol % or greater, 0.1 mol % or greater, 7 mol % or greater, or 9 mol % or greater. The degree of acetylation of the polyvinyl acetal resin (1) may be 30 mol % or less, 25 mol % or less, or 15 mol % or less. In a case where the degree of acetylation is equal to or greater than the aforementioned lower limit, compatibility between the polyvinyl acetal resin and a plasticizer is improved. In a case where the degree of, acetylation is equal to or less than the aforementioned upper limit, moisture resistance of the interlayer film and the laminated glass is improved. Particularly, in a case where the degree of acetylation of the polyvinyl acetal resin (1) is 0.1 to 25 mol %, penetration resistance becomes excellent.

A degree of acetylation of each of the polyvinyl acetal resin (2) and the polyvinyl acetal resin (3) may be 0.01 mol % or greater, for example 0.5 mol % or greater. The degree of acetylation may be 10 mol % or less, 2 mol % or less, or 20 mol % or less. In a case where the degree of acetylation is equal to or greater than the aforementioned lower limit, compatibility between the polyvinyl acetal resin and a plasticizer is improved. In a case where the degree of acetylation is equal to or less than the aforementioned upper limit, moisture resistance of the interlayer film and the laminated glass is improved.

The degree of acetylation is a value obtained by expressing a molar fraction, which is determined by dividing an amount of ethylene groups to which acetyl groups are bonded by a total amount of ethylene groups on a main chain, as a percentage. The amount of ethylene groups to which acetyl groups are bonded can be measured based on, for example, JIS K6728 "Testing methods for polyvinyl butyral".

A degree of acetalization (in a case of polyvinyl butyral resin, a degree of butyralization) of the polyvinyl acetal resin (1) may be 47 mol % or greater, for example 60 mol % or greater. The degree of acetalization may be 85 mol % or less, 80 mol % or less, or 75 mol % or less. In a case where the degree of acetalization is equal to or greater than the aforementioned lower limit, compatibility between the polyvinyl acetal resin and a plasticizer is improved. In a case where the degree of acetalization is equal to or less than the aforementioned upper limit, a reaction time necessary for manufacturing the polyvinyl acetal resin is shortened.

A degree of acetalization (in a case of polyvinyl butyral resin, a degree of butyralization) of each of the polyvinyl acetal resin (2) and the polyvinyl acetal resin (3) may be 55 mol % or greater, for example 60 mol % or greater. The degree of acetalization may be 75 mol % or less, for example 71 mol % or less. In a case where the degree of acetalization is equal to or greater than the aforementioned lower limit, compatibility between the polyvinyl acetal resin and a plasticizer is improved. In a case where the degree of acetalization is equal to or less than the aforementioned upper limit, a reaction time necessary for manufacturing the polyvinyl acetal resin is shortened.

The degree of acetalization is a value obtained by subtracting an amount of ethylene groups, to which hydroxyl groups are bonded, and an amount of ethylene groups, to which acetyl groups are bonded, from a total amount of ethylene groups on a main chain, dividing a value obtained as above by the total amount of ethylene groups on a main chain, and expressing a molar fraction obtained as above as a percentage.

The content ratio of hydroxyl groups (amount of hydroxyl groups), the degree of acetalization (degree of butyralization), and the degree of acetylation described above may be calculated from results measured by methods based on JIS K6728 "Testing methods for polyvinyl butyral". Here, the measurement based on ASTM D1396-92 may be used. In a case where the polyvinyl acetal resin is a polyvinyl butyral resin, the content ratio of hydroxyl groups (amount of hydroxyl groups), the degree of acetalization (degree of butyralization), and the degree of acetylation can be calculated from results measured by methods based on JIS K6728 "Testing methods for polyvinyl butyral".

From the viewpoint of further improving penetration resistance of the laminated glass, the polyvinyl acetal resin (1) may be a polyvinyl acetal resin (A) having a degree of acetylation (a) of less than 8 mol % and a degree of acetalization (a) of 65 mol % or greater or a polyvinyl acetal resin (B) having a degree of acetylation (b) of 8 mol % or greater. The polyvinyl acetal resin (2) and the polyvinyl acetal resin (3) may be the polyvinyl acetal resin (A) or the polyvinyl acetal resin (B).

The degree of acetylation (a) of the polyvinyl acetal resin (A) is less than 8 mol %, 7.9 mol % or less, 7.8 mol % or less, 6.5 mol % or less, or 6 mol % or less. The degree of acetylation (a) may be 0.1 mol % or greater, 0.5 mol % or greater, 2 mol % or greater, 5 mol % or greater, or 5.5 mol % or greater. In a case where the degree of acetylation (a) is 0.1 mol % or greater and less than 8 mol %, migration of a plasticizer can be easily controlled, and sound insulating properties of the laminated glass are further improved.

The degree of acetalization (a) of the polyvinyl acetal resin (A) may be 65 mol % or greater, 66 mol % or greater, 67 mol % or greater, 67.5 mol % or greater, or 75 mol % or greater. The degree of acetalization (a) may be 85 mol % or less, 84 mol % or less, 83 mol % or less, or 82 mol % or less. In a case where the degree of acetalization (a) is equal to or greater than the aforementioned lower limit, sound insulating properties of the laminated glass are further improved. In a case where the degree of acetalization (a) is equal to or less than the aforementioned upper limit, a reaction time necessary for manufacturing the polyvinyl acetal resin (A) can be shortened.

A content ratio (a) of a hydroxyl group of the polyvinyl acetal resin (A) may be 18 mol % or greater, 19 mol % or greater, 20 mol % or greater, 21 mol % or greater, or 23 mol % or greater. The content ratio (a) of the hydroxyl group may be 31 mol % or less, 30 mol % or less, 29 mol % or less, or 28 mol % or less. In a case where the content ratio (a) of the hydroxyl group is equal to or greater than the aforementioned lower limit, adhesion of the aforementioned second layer is further improved. In a case where the content ratio (a) of the hydroxyl group is equal to or less than the aforementioned upper limit, sound insulating properties of the laminated glass are further improved.

A degree of acetylation (b) of the polyvinyl acetal resin (B) may be 8 mol % or greater, 9 mol % or greater, 9.5 mol % or greater, 10 mol % or greater, or 10.5 mol % or greater. The degree of acetylation (b) may be 30 mol % or less, 28 mol % or less, 26 mol % or less, or 24 mol % or less. In a case where the degree of acetylation (b) is equal to or greater than the aforementioned lower limit, sound insulating properties of the laminated glass are further improved. In a case where the degree of acetylation (b) is equal to or less than the aforementioned upper limit, a reaction time necessary for manufacturing the polyvinyl acetal resin (B) can be shortened.

A degree of acetalization (b) of the polyvinyl acetal resin (B) may be 50 mol % or greater, 53 mol % or greater, 55 mol % or greater, or 60 mol % or greater. The degree of acetalization (b) may be 78 mol % or less, 75 mol % or less, 72 mol % or less, or 70 mol % or less. In a case where the degree of acetalization (b) is equal to or greater than the aforementioned lower limit, sound insulating properties of the laminated glass are further improved. In a case where the degree of acetalization (b) is equal to or less than the aforementioned upper limit, a reaction time necessary or manufacturing the polyvinyl acetal resin (B) can be shortened.

A content ratio (b) of a hydroxyl group of the polyvinyl acetal resin (B) may be 18 mol % or greater, 19 mol % or greater, 20 mol % or greater, 21 mol % or greater, or 23 mol % or greater. The content ratio (b) of the hydroxyl group may be 31 mol % or less, 30 mol % or less, 29 mol % or less, or 28 mol % or less. In a case where the content ratio (b) of the hydroxyl group is equal to or greater than the aforementioned lower limit, adhesion of the aforementioned second layer is further improved. In a case where the content ratio (b) of the hydroxyl group is equal to or less than the aforementioned upper limit, sound insulating properties of the laminated glass are further improved.

Each of the polyvinyl acetal resin (A) and the polyvinyl acetal resin (B) may be a polyvinyl butyral resin.

(Plasticizer)

The aforementioned first layer (including a single-layered interlayer film) may contain a plasticizer (hereinafter, described as a plasticizer (1) in some cases). The aforementioned second layer may contain a plasticizer (hereinafter, described as a plasticizer (2) in some cases). Furthermore, the aforementioned third layer may contain a plasticizer (hereinafter, described as a plasticizer (3) in some cases). The combination use of the plasticizer or the use of the polyvinyl acetal resin and the plasticizer appropriately improves the adhesion of the layer including the polyvinyl acetal resin and the plasticizer to a lamination glass member or other layers. The plasticizer is not particularly limited. The plasticizers (1), (2), and (3) may be the same as or different from each other. One kind of each of the plasticizers (1), (2), and (3) may be used singly, or two or more kinds thereof may be used in combination.

Examples of the aforementioned plasticizer include organic ester plasticizers such as a monobasic organic acid ester and a polybasic organic acid ester, organic phosphoric acid plasticizers such as an organic phosphoric acid plasticizer and an organic phosphorous acid plasticizer, and the like. Among these, organic ester plasticizers may be used. The aforementioned plasticizer may be a liquid plasticizer.

Examples of the aforementioned monobasic organic acid ester include a glycol ester obtained by reacting glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethyl butyrate, heptanoic acid, n-octylic acid, 2-ethylhexanoic acid, n-nonylic acid, decylic acid, and the like.

Examples of the aforementioned polybasic organic acid ester include an ester compound of a polybasic organic acid and an alcohol having a linear or branched structure containing 4 to 8 carbon atoms, and the like. Examples of the polybasic organic acid include adipic acid, sebacic acid, azelaic acid, and the like.

Examples of the aforementioned organic ester plasticizers include triethylene glycol-di-2-ethyl propanoate, triethylene glycol-di-2-ethyl butyrate, triethylene glycol-di-2-ethyl hexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethyl butyrate, 1,3-propylene glycol di-2-ethyl butyrate, 1,4-butylene glycol di-2-ethyl butyrate, diethylene glycol di-2-ethyl butyrate, diethylene glycol di-2-ethyl hexanoate, dipropylene glycol di-2-ethyl butyrate, triethylene glycol di-2-ethyl pentanoate, tetraethylene glycol di-2-ethyl butyrate, diethylene glycol dicaprylate, dihexyl adipate, dioctyl adipate, cyclohexyl hexyl adipate, a mixture of heptyl adipate and nonyl adipate, diisononyl adipate, diisodecyl adipate, heptyl nonyl adipate, dibutyl sebacate, oil-modified alkyd sebacate, a mixture of a phosphoric acid ester and an adipic acid ester, and the like. Organic ester plasticizers other than these may also be used, and an adipic acid ester other than the aforementioned adipic acid ester may also be used.

Examples of the aforementioned organic phosphoric acid plasticizers include tributoxyethyl phosphate, isodecylphenyl phosphate, triisopropyl phosphate, and the like.

The aforementioned plasticizer may be a diester plasticizer represented by the following Formula (1).

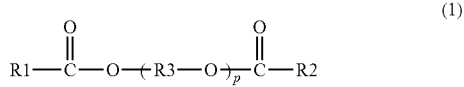
(1)

In Formula (1), each of R1 and R2 represents an organic group having 2 to 10 carbon atoms, R3 represents an ethylene group, an isopropylene group, or a n-propylene group, and p represents an integer of 3 to 10. Each of R1 and R2 in Formula (1) may be an organic group having 5 to 10 carbon atoms, or an organic group having 6 to 10 carbon atoms.

The aforementioned plasticizer may include di-(2-butoxyethyl)-adipate (DBEA), triethylene glycol di-2-ethylhexanoate (3GO), triethylene glycol di-2-ethylbutyrate (3GH), or triethylene glycol di-2-ethylpropanoate. It may include triethylene glycol di-2-ethylhexanoate (3GO), triethylene glycol di-2-ethylbutyrate (3GH), or triethylene glycol di-2-ethylpropanoate. It may include triethylene glycol di-2-ethylhexanoate or triethylene glycol di-2-ethylbutyrate. It may include triethylene glycol di-2-ethylhexanoate.

Each of a content of the plasticizer (2) (hereinafter, described as a content (2) in some cases) with respect to 100 parts by weight of the thermoplastic resin (2) and a content of the plasticizer (3) (hereinafter, described as a content (3) in some cases) with respect to 100 parts by weight of the thermoplastic resin (3) may be 10 parts by weight or greater, 15 parts by weight or greater, 20 parts by weight or greater, or 24 parts by weight or greater. Each of the content (2) and the content (3) may be 40 parts by weight or less, 35 parts by weight or less, 32 parts by weight or less, or 30 parts by weight or less. In a case where each of the content (2) and the content (3) is equal to or greater than the aforementioned lower limit, flexibility of the interlayer film is improved, and handling of the interlayer film becomes easy. In a case where each of the content (2) and the content (3) is equal to or less than the aforementioned upper limit, bending rigidity is further improved.

A content of the plasticizer (1) (hereinafter, described as a content (1) in some cases) with respect to 100 parts by weight of the thermoplastic resin (1) may be parts by weight or greater, 55 parts by weight or greater, or 60 parts by weight or greater. The content (1) may be 100 parts by weight or less, 90 parts by weight or less, 85 parts by weight or less, or 80 parts by weight or less. In a case where the content (1) is equal to or greater than the aforementioned lower limit, flexibility of the interlayer film is improved, and handing of the interlayer film becomes easy. In a case where the content (1) is equal to or less than the aforementioned upper limit, penetration resistance of the laminated glass is further improved.

In order to improve sound insulating properties of the laminated glass, the content (1) may be greater than the content (2) and the content (3). Particularly, although laminated glass including an interlayer film in which the content (1) is 55 parts by weight or greater tends to have low bending rigidity, in a case where the aforementioned first layer contains silica particles, bending rigidity can be markedly improved.

From the viewpoint of further improving sound insulating properties of the laminated glass, each of an absolute value of a difference between the content (2) and the content (1) and an absolute value of a difference between the content (3) and the content (1) may be 10 parts by weight or greater, 15 parts by weight or greater, or 20 parts by weight or greater. Each of the absolute value of the difference between the content (2) and the content (1) and the absolute value of the difference between the content (3) and the content (1) may be 80 parts by weight or less, 75 parts by weight or less, or 70 parts by weight or less.

(Silica Particles)

The aforementioned first layer contains silica particles. The use of silica particles improves bending rigidity without deteriorating sound insulating properties and improves the adhesion between respective layers. One kind of the silica particles may be used singly, or two or more kinds thereof may be used in combination.

A specific surface area of the silica particles determined by a BET method may be 50 m$^2$/g or greater, 100 m$^2$/g or greater, 200 m²/g or greater, 250 m²/g or greater, or 300 m²/g or greater. The specific surface area of the silica particles may be 500 m²/g or less. The specific surface area can be measured by a gas adsorption method by using a specific surface area/pore size distribution analyzer. Examples of the analyzer include "ASAP 2420" manufactured by Shimadzu Corporation, and the like.

A content of the silica particles with respect to 100 parts by weight of the thermoplastic resin (1) may be 1 part by weight or greater, 5 parts by weight or greater, 10 parts by weight or greater, or 15 parts by weight or greater. The content of the silica particles may be 70 parts by weight or less, 64 parts by weight or less, 60 parts by weight or less, 55 parts by weight or less, 45 parts by weight or less, or 35 parts by weight or less. In a case where the content of the silica particles is equal to or greater than the aforementioned lower limit, the adhesion between respective layers is further improved, and bending rigidity is further improved. In a case where the content of the silica particles is equal to or less than the aforementioned upper limit, sound insulating properties are further improved.

(Heat Shielding Compound)

The aforementioned interlayer film may contain a heat shielding compound. Furthermore, each of the aforementioned first layer, second layer, and third layer may contain a heat shielding compound. One kind of the heat shielding compound may be used singly, or two or more kinds thereof may be used in combination.

Component X:

The aforementioned interlayer film may contain, as a component X, at least one kind of compound among a phthalocyanine compound, a naphthalocyanine compound, and an anthracyanine compound. Each of the aforementioned first layer, second layer, and third layer may contain the component X. The component X is a heat shielding compound. One kind of the component X may be used singly, or two or more kinds thereof may be used in combination.

The component X is not particularly limited. As the component X, it is possible to use a phthalocyanine compound, a naphthalocyanine compound, and an anthracyanine compound known in the related art.

From the viewpoint of further improving heat shielding properties of the interlayer film and the laminated glass, the component X may be at least one kind of compound selected from the group consisting of phthalocyanine, a phthalocyanine derivative, naphthalocyanine, and a naphthalocyanine derivative, for example at least one kind of compound between phthalocyanine and a phthalocyanine derivative.

From the viewpoint of effectively improving heat shielding properties and maintaining a visible light transmittance at a much higher level over a long period of time, the component X may contain a vanadium atom or a copper atom. The component X may contain either a vanadium atom or a copper atom. The component X may be at least one kind of compound between phthalocyanine containing a vanadium atom or a copper atom and a phthalocyanine derivative containing a vanadium atom or a copper atom. From the viewpoint of further improving heat shielding properties of the interlayer film and the laminated glass, the component X may have a structural unit in which an oxygen atom is bonded to a vanadium atom.

A content of the component X in 100% by weight of the layer (the first layer, the second layer, or the third layer) containing the component X may be 0.001% by weight or greater, 0.005% by weight or greater, 0.01% by weight or greater, or 0.02% by weight or greater. The content of the component X may be 0.2% by weight or less, 0.1% by weight or less, 0.05% by weight or less, or preferably 0.04% by weight or less. In a case where the content of the component X is equal to or greater than the aforementioned lower limit and equal to or less than the aforementioned upper limit, heat shielding properties are sufficiently improved, and a visible light transmittance is sufficiently improved. For example, the visible light transmittance can become 70% or greater.

Heat Shielding Particles:

The aforementioned interlayer film may contain heat shielding particles. Each of the aforementioned first layer, second layer, and third layer may contain the heat shielding particles. The heat shielding particles are a heat shielding compound. The use of the heat shielding particles makes it possible to effectively block infrared rays (heat rays). One kind of the heat shielding particles may be used singly, or two or more kinds thereof may be used in combination.

From the viewpoint of further improving heat shielding properties of the laminated glass, the heat shielding particles may be metal oxide particles. The heat shielding particles may be particles formed of a metal oxide (metal oxide particles).

Infrared rays having a wavelength of 780 nm or greater that is longer than a wavelength of visible light have a small energy amount compared to ultraviolet rays. However, infrared rays exert a strong thermal effect and are released as heat when being absorbed into a substance. Therefore, infrared rays are generally called heat rays. The use of the heat shielding particles makes it possible to effectively block infrared rays (heat rays). The heat shielding particles refer to particles that can absorb infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles, and silicon-doped zinc oxide particles, lanthanum hexaboride ($LaB_6$) particles, and the like. Heat shielding particles other than these may also be used. Among these, metal oxide particles may be used because these particles have a high function of blocking heat rays. The metal oxide particles may be ATO particles, GZO particles, IZO particles, ITO particles, or tungsten oxide particles. They may be ITO particles or tungsten oxide particles. Especially, tin-doped indium oxide particles (ITO particles) may be used because these particles have a high function of blocking heat rays and are easily obtained, and tungsten oxide particles may also be used.

From the viewpoint of further improving heat shielding properties of the interlayer film and the laminated glass, the tungsten oxide particles may be metal-doped tungsten oxide particles. The "tungsten oxide particles" include metal-doped tungsten oxide particles. Specific examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further improving heat shielding properties of the interlayer film and the laminated glass, cesium-doped tungsten oxide particles may be used. From the viewpoint of further improving heat shielding properties of the interlayer film and the laminated glass, the cesium-doped tungsten oxide particles may be tungsten oxide particles represented by Formula: $Cs_{0.33}WO_3$.

An average particle size of the heat shielding particles may be 0.01 μm or greater, for example 0.02 μm or greater. The average particle size may be 0.1 μm or less, for example 0.05 μm or less. In a case where the average particle size is equal to or greater than the aforementioned lower limit, shielding properties for heat rays are sufficiently improved. In a case where the average particle size is equal to or less than the aforementioned upper limit, dispersibility of the heat shielding particles is improved.

The aforementioned "average particle size" means a volume average particle size. The volume average particle size can be measured using a particle size distribution analyzer ("UPA-EX150" manufactured by NIKKISO CO., LTD.) or the like.

A content of the heat shielding particles in 100% by weight of the layer (the first layer, the second layer, or the third layer) containing the heat shielding particles may be 0.01% by weight or greater, 0.1% by weight or greater, 1% by weight or greater, or 1.5% by weight or greater. The content of the heat shielding particles may be 6% by weight or less, 5.5% by weight or less, 4% by weight or less, 3.5% by weight or less, or 3% by weight or less. In a case where the content of the heat shielding particles is equal to or greater than the aforementioned lower limit and equal to or less than the aforementioned upper limit, heat shielding properties are sufficiently improved, and a visible light transmittance is sufficiently improved.

(Metal Salt)

The aforementioned interlayer film may contain at least one kind of metal salt (hereinafter, described as a metal salt M in some cases) among alkali metal salts and alkaline earth metal salts. Each of the aforementioned first layer, second layer, and third layer may contain the metal salt M. The use of the metal salt M makes it easy to control adhesiveness between the interlayer film and the lamination glass member or the adhesiveness between the respective layers in the interlayer film. One kind of the metal salt M may be used singly, or two or more kinds thereof may be used in combination.

The metal salt M may contain at least one kind of metal selected from the group consisting of Li, Na, K, Rb, Cs, Mg, Ca, Sr, and Ba. The metal salt contained in the interlayer film may contain at least one kind of metal between K and Mg.

The metal salt M may be an alkali metal salt of an organic acid having 2 to 16 carbon atoms or an alkaline earth metal salt of an organic acid having 2 to 16 carbon atoms, for example a magnesium carboxylic acid salt having 2 to 16 carbon atoms or a potassium carboxylic acid salt having 2 to 16 carbon atoms.

The magnesium carboxylic acid salt having 2 to 16 carbon atoms and the potassium carboxylic acid salt having 2 to 16 carbon atoms are not particularly limited, and examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

A total content of Mg and K in the layer (the first layer, the second layer, or the third layer) containing the metal salt M may be 5 ppm or greater, 10 ppm or greater, or 20 ppm or greater. The total content of Mg and K may be 300 ppm or less, 250 ppm or less, or 200 ppm or less. In a case where the total content of Mg and K is equal to or greater than the aforementioned lower limit and equal to or less than the aforementioned upper limit, adhesiveness between the interlayer film and the lamination glass member or adhesiveness between the respective layers in the interlayer film can be controlled much better.

(UV Shielding Agent)

The aforementioned interlayer film may contain a UV shielding agent. Each of the aforementioned first layer, second layer, and third layer may contain a UV shielding agent. The use of the UV shielding agent more reliably prevents a visible light transmittance from decreasing even if the interlayer film and the laminated glass are used for a long period of time. One kind of the UV shielding agent may be used singly, or two or more kinds thereof may be used in combination.

The UV shielding agent includes a UV absorber. The UV shielding agent may be a UV absorber.

Examples of the UV shielding agent include a UV shielding agent containing a' metal atom, a UV shielding agent containing a metal oxide, a UV shielding agent having a benzotriazole structure, a UV shielding agent having a benzophenone structure, a UV shielding agent having a triazine structure, a UV shielding agent having a malonic acid ester structure, a UV shielding agent having an oxalic acid anilide structure, a UV shielding agent having a benzoate structure, and the like.

Examples of the aforementioned UV absorber containing a metal atom include platinum particles, platinum particles whose surfaces are coated with silica, palladium particles, palladium particles whose surfaces are coated with silica, and the like. It is possible that the UV shielding agent is not heat shielding particles.

The aforementioned UV shielding agent may be a UV shielding agent having a benzotriazole structure, a UV shielding agent having a benzophenone structure, a UV shielding agent having a triazine structure, or a UV shielding agent having a benzoate structure. It may be a UV shielding agent having a benzotriazole structure or a UV shielding agent having a benzophenone structure. It may be a UV absorber having a benzotriazole structure.

Examples of the aforementioned UV absorber containing a metal oxide include zinc oxide, titanium oxide, cerium oxide, and the like. The surface of the UV absorber containing a metal oxide may be coated. Examples of materials, with which the surface of the UV absorber containing a metal oxide is coated, include an insulative metal oxide, a hydrolysable organic silicon compound, a silicone compound, and the like.

Examples of the aforementioned UV absorber having a benzotriazole structure include UV absorbers having a benzotriazole structure, such as 2-(2'-hydroxy-5'-methylphenyl) benzotriazole ("Tinuvin P" manufactured by BASF SE), 2-(2'-hydroxy-3',5'-di-t-butylphenyl)benzotriazole ("Tinuvin 320" manufactured by BASF SE), 2-(2'-hydroxy-3'-t-butyl-5-methylphenyl)-5-chlorobenzotriazole ("Tinuvin 326" manufactured by BASF SE), and 2-(2'-hydroxy-3',5'-di-amylphenyl)benzotriazole ("Tinuvin 328" manufactured by BASF SE). The above UV shielding agent may be a UV absorber having a benzotriazole structure containing a halogen atom, for example a UV absorber having a benzotriazole structure containing a chlorine atom, because these have excellent UV absorbing performance.

Examples of the aforementioned UV absorber having a benzophenone structure include octabenzone ("Chimassorb 81" manufactured by BASF SE) and the like.

Examples of the aforementioned UV absorber having a triazine structure include "LA-F70" manufactured by ADEKA Corporation, 2-(4,6-diphenyl-1,3,5-triazin-2-yl)-5-[(hexyl)oxy]-phenol ("Tinuvin 1577FF" manufactured by BASF SE), and the like.

Examples of the UV shielding agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl 4-piperidinyl)malonate, and the like.

Examples of commercially available products of the UV shielding agent having a malonic acid ester structure include Hostavin B-CAP, Hostavin PR-25, and Hostavin PR-31 (all manufactured by Clariant International Ltd.).

Examples of the aforementioned UV shielding agent having an oxalic acid anilide structure include oxalic acid diamides having a substituted aryl group on a nitrogen atom, such as N-(2-ethylphenyl)-N'-(2-ethoxy-5-t-butylphenyl) oxalic acid diamide, N-(2-ethylphenyl)-N'-(2-ethoxy-phenyl)oxalic acid diamide, and 2-ethyl-2'-ethoxy-oxyanilide ("Sanduvor VSU" manufactured by Clariant International Ltd.).

Examples of the aforementioned UV absorber having a benzoate structure include 2,4-di-tert-butylphenyl-3,5-di-tert-butyl-4-hydroxybenzoate ("Tinuvin 120" manufactured by BASF SE) and the like.

From the viewpoint of further inhibiting a decrease in a visible light transmittance after a passage of time, a content of the UV shielding agent in 100% by weight of the layer (the first layer, the second layer, or the third layer) containing the UV shielding agent may be 0.1% by weight or greater, 0.2% by weight or greater, 0.3% by weight or greater, or 0.5% by weight or greater. The content of the UV shielding agent may be 2.5% by weight or less, 2% by weight or less, 1% by weight or less, or 0.8% by weight or less. Particularly, in a case where the content of the UV shielding agent in 100% by weight of the layer containing the UV shielding agent is 0.2% by weight or greater, a decrease in a visible light transmittance of the interlayer film and the laminated glass that occurs after a passage of time can be markedly inhibited.

(Antioxidant)

The aforementioned interlayer film may contain an antioxidant. Each of the aforementioned first layer, second layer, and third layer may contain an antioxidant. One kind of the antioxidant may be used singly, or two or more kinds thereof may be used in combination.

Examples of the antioxidant include a phenol-based antioxidant, a sulfur-based antioxidant, a phosphorus-based antioxidant, and the like. The phenol-based antioxidant is an antioxidant having a phenol skeleton. The sulfur-based antioxidant is an antioxidant containing a sulfur atom. The phosphorus-based antioxidant is an antioxidant containing a phosphorus atom.

The antioxidant may be a phenol-based antioxidant or a phosphorus-based antioxidant.

Examples of the aforementioned phenol-based antioxidant include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris (3,5-di-t-butyl-4-hydroxybenzyl)benzene, bis(3,3'-t-butylphenol)butyric acid glycol ester, bis(3-t-butyl-4-hydroxy-5-methylbenzene propanoate)ethylenebis (oxyethylene), and the like. One kind or two or more kinds among these antioxidants are suitably used.

Examples of the aforementioned phosphorus-based antioxidant include tridecyl phosphite, tris(tridecyl) phosphite, triphenyl phosphite, trinonylphenyl phosphite, bis(tridecyl) pentaerythritol di$_p$hosphite, bis(decyl)pentaerythritol diphosphite, tris(2,4-di-t-butylphenyl) phosphite, bis(2,4-di-t-butyl-6-methylphenyl)ethyl ester phosphorous acid, tris(2,4-di-t-butylphenyl)phosphite, 2,2'-methylenebis(4,6-di-t-butyl-1-phenyloxyl)(2-ethylhexyloxy)phosphorus, and the like. One kind or two or more kinds among these antioxidants are suitably used.

Examples of commercially available products of the above antioxidants include "IRGANOX 245" manufactured by BASF SE, "IRGAFOS 168" manufactured by BASF SE, "IRGAFOS 38" manufactured by BASF SE, "SUMILIZER BHT" manufactured by Sumitomo Chemical Industry Company Limited, "IRGANOX 1010" manufactured by BASF SE, and the like.

In order to maintain a high visible light transmittance of the interlayer film and the laminated glass for a long period of time, a content of the aforementioned antioxidant in 100% by weight of the interlayer film or in 100% by weight of the layer (the first layer, the second layer, or the third layer) containing the antioxidant may be 0.1% by weight or greater. Furthermore, because the effects obtained by the addition of the antioxidant are saturated, the content of the antioxidant in 100% by weight of the interlayer film or in 100% by weight of the layer containing the antioxidant may be 2% by weight or less.

(Other Components)

If necessary, each of the aforementioned first layer, second layer, and third layer may contain additives such as a coupling agent containing silicon, aluminum, or titanium, a dispersant, a surfactant, a flame retardant, an antistatic agent, a pigment, a dye, an adhesion adjuster, a moisture proof agent, a fluorescent whitening agent, and an infrared absorber. One kind of these additives may be used singly, or two or more kinds thereof may be used in combination.

(Other Details of Interlayer Film for Laminated Glass)

From the viewpoint of further improving sound insulating properties of the laminated glass, the glass transition temperature of the first layer may be 15° C. or lower, 10° C. or lower, 5° C. or lower, or 0° C. or lower. The glass transition temperature of the first layer may be −20° C. or higher.

The glass transition temperature of the first layer is lower than a glass transition temperature of the second and third layers. That is, from the viewpoint of improving bending rigidity of the laminated glass, the glass transition temperature of the second and third layers are made higher than the glass transition temperature of the first layer. In a case where the first layer having a glass transition temperature lower than that of the second and third layers contains silica particles, and the interlayer film includes the second and third layers having a glass transition temperature higher than that of the first layer, bending rigidity of the laminated glass is markedly improved. From the viewpoint of further improving bending rigidity and sound insulating properties of the laminated glass, an absolute value of a difference between the glass transition temperature of the first layer and the glass transition temperature of the second and third layers may be 10° C. or higher, 20° C. or higher, 30° C. or higher, or 35° C. or higher. The absolute value of the difference between the glass transition temperature of the first layer and the glass transition temperature of the second and third layers may be 70° C. or lower.

The glass transition temperature can be measured by, for example, a method in which immediately after the obtained interlayer film is stored for 12 hours in an environment with a room temperature that equals 23±2° C. and a humidity that equals 25±5%, viscoelasticity thereof is measured using a viscoelasticity analyzer "DVA-200" manufactured by IT Keisoku Seigyo Co., Ltd. The glass transition temperature may be measured under the conditions in which the interlayer film is cut in 8 mm (length)×5 mm (width) and heated in a shear mode up to 100° C. from −30° C. at a rate of temperature increase of 5° C./min, a frequency of 1 Hz, and a strain of 0.08%.

From the viewpoint of inhibiting the occurrence of flow marks, tan δ of the first layer at 200° C. is 0.8 or greater. From the viewpoint of further inhibiting the occurrence of flow marks, tan δ of the first layer at 200° C. may be 0.85 or greater, 0.9 or greater, 1.0 or greater, or 1.5 or greater. tan δ of the first layer at 200° C. may be 7 or less, 5 or less, or 3 or less.

Examples of a method for measuring tan δ, of the first layer at 200° C. includes a method (1) of measuring tan δ of a composition, which is for forming the first layer, at 200° C., and a method (2) of measuring tan δ of the first layer, which is obtained by peeling the second and third layers from the interlayer film, at 200° C. As the method (1), a kneaded material of the composition for forming the first layer may be press-molded by a press molding machine so as to prepare a resin film A having a thickness of 0.35 mm, the resin film A is dried for 2 hours or longer at 50° C. in a vacuum, viscoelasticity thereof is measured using a "rheometer ARES-G2" manufactured by TA Instruments, and tan δ of the first layer at 200° C. is measured. As the method (2), the first layer, which is obtained by peeling the second and third layers from the interlayer film in an environment with a temperature of 23° C., may be press-molded by a press molding machine at 150° C. (for 10 minutes at 150° C. in a non-pressurized state and for 10 minutes at 150° C. in a pressurized state) such that a thickness thereof becomes 0.35 mm and a resin film A is prepared, the resin film A is dried for 2 hours or longer at 50° C. in a vacuum, viscoelasticity thereof is measured using a "rheometer ARES-G2" manufactured by TA Instruments, and tan δ of the first layer at 200° C. is measured. In the methods (1) and (2), a parallel plate having a diameter of 8 mm is taken as geometry of a jig for measurement, the measurement is performed under the conditions of a temperature: 200° C., strain: 8%, frequency range: 100 to 0.1 rad/s, sweeping is performed from 100 rad/s, and a value of tan δ at a frequency of 0.1 rad/s is taken as "tan δ at 200° C.".

A thickness of the aforementioned interlayer film is not particularly limited. From the viewpoint of practically and from the viewpoint of sufficiently improving penetration resistance and bending rigidity of the laminated glass, the thickness of the interlayer film may be 0.1 mm or greater, for example 0.25 mm or greater. The thickness of the interlayer film may be 3 mm or less, 2 mm or less, or 1.5 mm or less. In a case where the thickness of the interlayer film is equal to or greater than the aforementioned lower limit, penetration resistance and bending rigidity of the laminated glass are improved. In a case where the thickness of the interlayer film is equal to or less than the aforementioned upper limit, transparency of the interlayer film is further improved.

The thickness of the interlayer film is denoted by T. A thickness of the aforementioned first layer may be 0.0625T or greater, for example 0.1T or greater. The thickness of the first layer may be 0.4T or less, 0.375T or less, 0.25T or less, or 0.15T or less. In a case where the thickness of the first layer is 0.4T or less, bending rigidity is further improved.

A thickness of each of the aforementioned second and third layers may be 0.3T or greater, 0.3125T or greater, or 0.375T or greater. The thickness of each of the second and third layers may be 0.9375T or less, for example 0.9T or less. The thickness of each of the second and third layers may be 0.46875T or less or 0.45T or less. In a case where the thickness of each of the second and third layers is equal to or greater than the aforementioned lower limit and equal to or less than the aforementioned upper limit, rigidity and sound insulating properties of the laminated glass are further improved.

A total thickness of the aforementioned second and third layers may be 0.625T or greater, 0.75T or greater, or 0.85T or greater. The total thickness of the second and third layers may be 0.9375T or less, for example 0.9T or less. In a case where the total thickness of the second and third layers is equal to or greater than the aforementioned lower limit and equal to or less than the aforementioned upper limit, rigidity and sound insulating properties of the laminated glass are further improved.

A method for manufacturing the interlayer film according to one or more embodiments of the present invention is not particularly limited. Examples of the method for manufacturing the interlayer film according to one or more embodiments of the present invention include a method of forming each layer by using each resin composition for forming each layer and then, for example, laminating the obtained each layer, a method of laminating each layer by co-extruding each resin composition for forming each layer by using an extruder, and the like. A manufacturing method using extrusion molding may be used because this method is suitable for continuous production.

The aforementioned second and third layers may contain the same polyvinyl acetal resin, and may contain the same polyvinyl acetal resin and the same plasticizer, because then manufacturing efficiency of the interlayer film becomes excellent. For the same reason, the second and third layers may be formed of the same resin composition.

According to one or more embodiments of the present invention, the aforementioned interlayer film has shapes of recesses and protrusions on at least one of the both surfaces thereof, and may have shapes of recesses and protrusions on both surfaces thereof. A method for forming the shapes of recesses and protrusions is not particularly limited, and examples thereof include a lip embossing method, an embossing roll method, a calendar roll method, a profile extrusion method, and the like. Among these, an embossing roll method may be used because this method makes it possible to form a large number of shapes of recesses and protrusions that are quantitatively constant recess and protrusion patterns.

(Laminated Glass)

Figure 2:
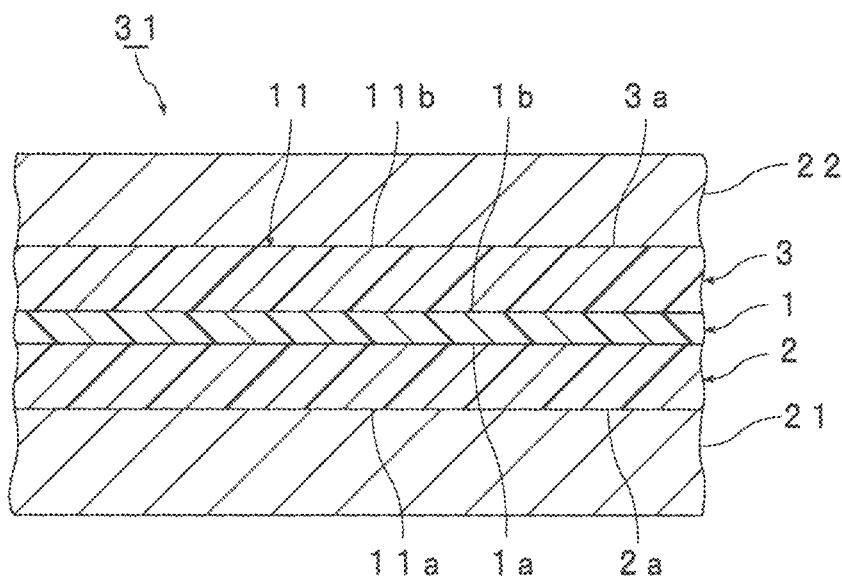
FIG. 2 is a sectional view schematically showing an example of interlayer film including the interlayer film for laminated glass shown in FIG. 1.

FIG. 2 is a sectional view schematically showing an example of laminated glass including the interlayer film for laminated glass shown in FIG. 1.

Laminated glass 31 shown in FIG. 2 includes a first lamination glass member 21, a second lamination glass member 22, and the interlayer film 11. The interlayer film 11 is disposed and interposed between the first lamination glass member 21 and the second lamination glass member 22.

The first lamination glass member 21 is laminated on a first surface 11a of the interlayer film 11. The second lamination glass member 22 is laminated on a second surface 11b of the interlayer film 11 that is opposite to the first surface 11a. The first lamination glass member 21 is laminated on a surface 2a of the second layer 2 that faces outside. The second lamination glass member 22 is laminated on a surface 3a of the third layer 3 that faces outside.

As described above, the laminated glass according to one or more embodiments of the present invention includes the first lamination glass member, the second lamination glass member, and the interlayer film, and the interlayer film is the interlayer film for laminated glass according to one or more embodiments of the present invention. In the laminated glass according to one or more embodiments of the present invention, the interlayer film is disposed between the first lamination glass member and the second lamination glass member.

Examples of the aforementioned lamination glass members include a glass plate, a polyethylene terephthalate (PET) film, and the like. The laminated glass includes not only laminated glass in which an interlayer film is interposed between two sheets of glass plates but also laminated glass in which an interlayer film is interposed between a glass plate and a PET film or the like. The laminated glass is a laminate including a glass plate, and at least one sheet of glass plate may be used in the laminated glass.

Examples of the glass plate include inorganic glass and organic glass. Examples of the inorganic glass include float plate glass, heat ray-absorbing plate glass, heat ray-reflecting plate glass, polished plate glass, figured glass, wired plate glass, and the like. The organic glass is synthetic resin glass as a substitute for inorganic glass. Examples of the organic glass include a polycarbonate plate, a poly(meth)acrylic resin plate, and the like. Examples of the poly(meth)acrylic resin plate include a polymethyl (meth)acrylate plate and the like.

A thickness of the aforementioned lamination glass member may be 1 mm or greater. The thickness of the lamination glass member may be 5 mm or less, for example 3 mm or less. In a case where the lamination glass member is a glass plate, a thickness of the glass plate may be 0.5 mm or greater, for example 0.7 mm or greater. The thickness of the glass plate may be 5 mm or less, for example 3 mm or less. In a case where the lamination glass member is a PET film, a thickness of the PET film may be 0.03 mm to 0.5 mm.

The use of the interlayer film according to one or more embodiments of the present invention makes it possible to maintain bending rigidity of the laminated glass at a high level even if the laminated glass has a small thickness. From the viewpoint of lightening the laminated glass, reducing an environmental load by reducing the amount of materials of the laminated glass, or reducing an environmental load by improving fuel efficiency of an automobile by means of lightening the laminated glass, the thickness of the aforementioned glass plate may be 2 mm or less, 1.8 mm or less, 1.5 mm or less, 1 mm or less, 0.8 mm or less, or 0.7 mm or less.

A method for manufacturing the laminated glass is not particularly limited. For example, the interlayer film is interposed between the aforementioned first and second lamination glass members and aspirated under reduced pressure by being passed through pressing rolls or put into a rubber bag such that air remaining between the first lamination glass member, the second lamination glass member, and the interlayer film is removed. Then, the first and second lamination glass members and the interlayer film are preliminarily bonded to each other at a temperature of about 70° C. to 110° C., thereby obtaining a laminate. Next, the laminate is put into an autoclave or pressed, and pressure-bonded at a temperature of about 120° C. to 150° C. under a pressure of 1 to 1.5 MPa. The laminated glass can be obtained in this way. At the time of manufacturing the laminated glass as above, the first layer, the second layer, and the third layer may be laminated.

The interlayer film and the laminated glass described above can be used in automobiles, railroad cars, airplanes, ships, buildings, and the like. Furthermore, the interlayer film and the laminated glass can also be used for other purposes. The interlayer film and the laminated glass may be an interlayer film and laminated glass for cars or buildings. They may be an interlayer film and laminated glass for cars. The interlayer film and the laminated glass can be used in front glass, side glass, rear glass, and roof glass of automobiles, and the like. The interlayer film and the laminated glass are suitably used in automobiles. The interlayer film is used for obtaining laminated glass for automobiles.

From the viewpoint of obtaining laminated glass having much better transparency, the aforementioned visible light transmittance of the laminated glass may be 65% or greater, for example 70% or greater. The visible light transmittance of the laminated glass can be measured based on JIS R3211 (1998). The visible light transmittance of the laminated glass, which is obtained by interposing the interlayer film for laminated glass according to one or more embodiments of the present invention between two sheets of green glass (heat ray-absorbing plate glass) having a thickness of 2 mm based on JIS R3206, may be 70% or greater. The visible light transmittance may be 75% or greater.

Hereinafter, one or more embodiments of the present invention will be more specifically described based on examples, but the present invention is not limited to the examples.

The following materials were prepared.
(Polyvinyl Acetal Resin)
Polyvinyl acetal resins shown in the following Tables 1 to 4 were appropriately used. For acetalization of all of the polyvinyl acetal resins used, n-butyraldehyde having 4 carbon atoms was used.

For the polyvinyl acetal resins, a degree of acetalization (degree of butyralization), a degree of acetylation, and a content ratio of hydroxyl groups were measured by the methods based on JIS K6728 "Testing methods for polyvinyl butyral". Herein, in a case where the degree of acetalization, the degree of acetylation, and the content ratio of hydroxyl groups were measured according to ASTM D1396-92, the same results were obtained as in a case where the methods based on JIS K6728 "Testing methods for polyvinyl butyral" were used.

(Plasticizer)
Triethylene glycol di-2-ethylhexanoate (3GO)
Di-(2-butoxyethyl)-adipate (DBEA)
(Silica Particles)
Silica particles (a) ("AEROSIL 380" manufactured by NIPPON AEROSIL CO., LTD., specific surface area determined by a BET method: 380±30 $m^2/g$)
Silica particles (b) ("BZ-400" manufactured by Tosoh Silica Corporation, specific surface area determined by a BET method: 450 $m^2/g$)
Silica particles (c) ("AZ-204" manufactured by Tosoh Silica Corporation, specific surface area determined by a BET method: 300 $m^2/g$)
Silica particles (d) ("AZ-201" manufactured by Tosoh Silica Corporation, specific surface area determined by a BET method: 300 $m^2/g$)
(UV Shielding Agent)
Tinuvin 326 (2-(2'-hydroxy-3'-t-butyl-5-methylphenyl)-5-chlorobenzotriazole, "Tinuvin 326" manufactured by BASF SE)
(Antioxidant)
BHT (2,6-di-t-butyl-p-cresol)

EXAMPLE 1

Preparation of Composition for Forming First Layer:

100 parts by weight of a polyvinyl acetal resin of a kind shown in the following Table 1, 60 parts by weight of the plasticizer (3GO), 20 parts by weight of the silica particles (a), 0.2 parts by weight of the UV shielding agent (Tinuvin 326), and 0.2 parts by weight of the antioxidant (BHT) were mixed together, thereby obtaining a composition for forming a first layer.

Preparation of Composition for Forming Second Layer and Third Layer:

100 parts by weight of a polyvinyl acetal resin of a kind shown in the following Table 1, 24 parts by weight of the plasticizer (3GO), 0.2 parts by weight of the UV shielding agent (Tinuvin 326), and 0.2 parts by weight of the antioxidant (BHT) were mixed together, thereby obtaining a composition for forming a second layer and a third layer.

Preparation of Interlayer Film:

The composition for forming the first layer and the composition or forming the second and third layers were co-extruded using a co-extruder, thereby preparing an interlayer film (thickness: 780 μm) having a laminated structure consisting of the second layer (thickness: 340 μm)/the first layer (thickness: 100 μm)/the third layer (thickness: 340 μm).

Preparation of Laminated Glass A (For Measuring Bending Rigidity):

Two glass plates (clear float glass, 25 cm (length) 10 cm (width)×2.5 mm (thickness)) that were washed and dried were prepared. The interlayer film obtained as above was interposed between the two glass plates, thereby obtaining a laminate. The obtained laminate was put into a rubber bag and deaerated for 20 minutes at a degree of vacuum of 2,660 Pa (20 torr). Then, the laminate was held in an autoclave in the deaerated state for 30 minutes at 90° C., and in this state, the laminate was pressed in a vacuum. The laminate preliminarily pressure-bonded in this way was pressure-bonded in the autoclave for 20 minutes under the conditions of a temperature of 135° C. and a pressure of 1.2 MPa (12 kg/cm$^2$), thereby obtaining laminated glass A.

Preparation of Laminated Glass B (For Measuring Bending Rigidity):

One glass plate (clear float glass, 25 cm (length)×10 cm (width)×2.5 mm (thickness)) that was washed and dried was prepared. Furthermore, one glass plate (Gorilla glass 2, 25 cm (length)×10 cm (width)×0.7 mm (thickness)) that was washed and dried was prepared. Laminated glass B was obtained in the same manner as used for obtaining the laminated glass A, except that the aforementioned two glass plates were used.

Preparation of Laminated Glass C (For Measuring Bending Rigidity):

Two glass plates (Gorilla glass 2, 25 cm (length)×10 cm (width)×0.7 mm (thickness)) that were washed and dried were prepared. Laminated glass C was obtained in the same manner as used for obtaining the laminated glass A, except that the aforementioned two glass plates were used.

Preparation of Laminated Glass G (For Measuring Bending Rigidity):

One glass plate (clear float glass, 25 cm (length)×10 cm (width)×1.8 mm (thickness)) that was washed and dried was prepared. Furthermore, one glass plate (clear float glass, 25 cm (length)×10 cm (width)×1.0 mm (thickness)) that was washed and dried was prepared. Laminated glass G was obtained in the same manner as used for obtaining the laminated glass A, except that the aforementioned two glass plates were used.

Preparation of Laminated Glass D (For Measuring Sound Insulating Properties):

The obtained interlayer film was cut in a size of 30 cm (length)×2.5 cm (width). Then, the interlayer film was interposed between two sheets of green glass (30 cm (length)×2.5 cm (width)×2 mm (thickness)) based on JIS R3208, thereby obtaining a laminate. The laminate was put into a rubber bag, deaerated for 20 minutes at a degree of vacuum of 2.6 kPa. Then, the laminate was moved to an oven in the deaerated state, held for 30 minutes at 90° C., and pressed in a vacuum such that the laminate was preliminarily pressure-bonded. In an autoclave, the preliminarily pressure-bonded laminate was pressure-bonded for 20 minutes under the conditions of a temperature of 135° C. and a pressure of 1.2 MPa, thereby obtaining laminated glass D.

Preparation of Laminated Glass E (For Measuring Visible Light Transmittance):

The obtained interlayer film was cut in a size of 5 cm (length)×5 cm (width). Then, two sheets of green glass (5 cm (length)×5 cm (width)×2 mm (thickness)) based on JIS R3208 were prepared. The obtained interlayer film was interposed between the two sheets of green glass, the resultant was held in a vacuum laminator for 30 minutes at 90° C., and pressed in a vacuum, thereby obtaining a laminate. In the laminate, the portion of the interlayer film sticking out of the glass plate was cut off, thereby obtaining laminated glass E.

Preparation of Laminated Glass F (For Evaluating Flow Marks):

The obtained interlayer film was cut in a size of 15 cm (length)×30 cm (width). Then clear float glass (15 cm (length)×30 cm (width)×2.5 mm (thickness)) was prepared. Between the two sheets of clear float glass, the obtained interlayer film was interposed, and the resultant was held in a vacuum laminator for 30 minutes at 90° C. and pressed in a vacuum, thereby obtaining a laminate. In the laminate, the portion of the interlayer film sticking out of the glass plate was cut off, thereby obtaining laminated glass F.

EXAMPLES 2 TO 26 AND COMPARATIVE EXAMPLES 1 TO 3

An interlayer film and laminated glass were obtained in the same manner as in Example 1, except that the type and the formulation amount of the polyvinyl acetal resin, the plasticizer, and the silica particles used in the composition for forming the first layer and the composition for forming the second and third layers were set as shown in the following Tables 1 to 4, and a thickness of each of the first layer, the second layer, and the third layer was set as shown in the following Tables 1 to 4. Furthermore, in Examples 2 to 26 and Comparative Examples 1 to 3, the same type of UV shielding agent and antioxidant as in Example 1 were formulated in the same formulation amount (0.2 parts by weight with respect to 100 parts by weight of the polyvinyl acetal resin) as in Example 1.

(Evaluation)

(1) Glass Transition Temperature

The obtained interlayer film was stored for 12 hours in an environment with room temperature that equaled 23±2° C. and a humidity that equaled 25±5%. Immediately after the storage, by using a viscoelasticity analyzer "DVA-200" manufactured by IT Keisoku Seigyo Co., Ltd., viscoelasticity of the interlayer film was measured. The sample was cut in a size of 8 mm (length)×5 mm (width), and the viscoelasticity thereof was measured under the conditions in which the sample was heated in a shear mode up to 100° C. from −30° C. at a rate of temperature increase of 5° C./min, a frequency of 1 Hz, and a strain of 0.08%. Among the obtained measurement results, a peak temperature of a loss tangent was taken as a glass transition temperature Tg (° C.). Tg resulting from the first layer was lower than Tg resulting from the second and third layers.

(2) Tan δ at 200° C.

A kneaded material of the composition for forming the first layer was prepared. The obtained kneaded material was press-molded by using a press molding machine, thereby obtaining a resin film A having a thickness of 0.35 mm. The obtained resin film A was dried in a vacuum for 2 hours or longer at 50° C. By using a "rheometer ARES-G2" manufactured by TA Instruments, viscoelasticity thereof was measured. A parallel plate having a diameter of 8 mm is taken as geometry of a jig for measurement, the measurement was performed under the conditions of a temperature: 200° C., strain: 8%, frequency range: 100 to 0.1 rad/s, sweeping was performed from 100 rad/s, and a value of tan δ at a frequency of 0.1 rad/s was taken as "tan δ at 200° C.". The resin film A may be prepared in a manner in which the first layer, which was obtained by peeling the second and third layers from the interlayer film in an environment with a temperature of 23° C., was press-molded at 150° C. (for 10 minutes at 150° C. in a non-pressurized state and for 10 minutes at 150° C. in a pressurized state) such that a thickness thereof became 0.35 mm.

(3) Flow Mark

As a light source, S-Light manufactured by NIPPON GIJUTSU co., LTD was used. The laminated glass F was disposed between the light source and a screen, such that a distance between the light source and the screen became 200 cm, and a distance between the light source and the interlayer film became 180 cm. The surface of the laminated glass F was directly irradiated with light. An image projected onto the screen was captured by a camera, and flow marks were judged based on the following criteria.

[Criteria for Judging Flow Marks]

O: Streak-like irregularities (flow marks) were not clearly observed.

Δ: Slight Streak-like irregularities (flow marks) were observed.

×: Streak-like irregularities (flow marks) were observed.

Figure 4A:
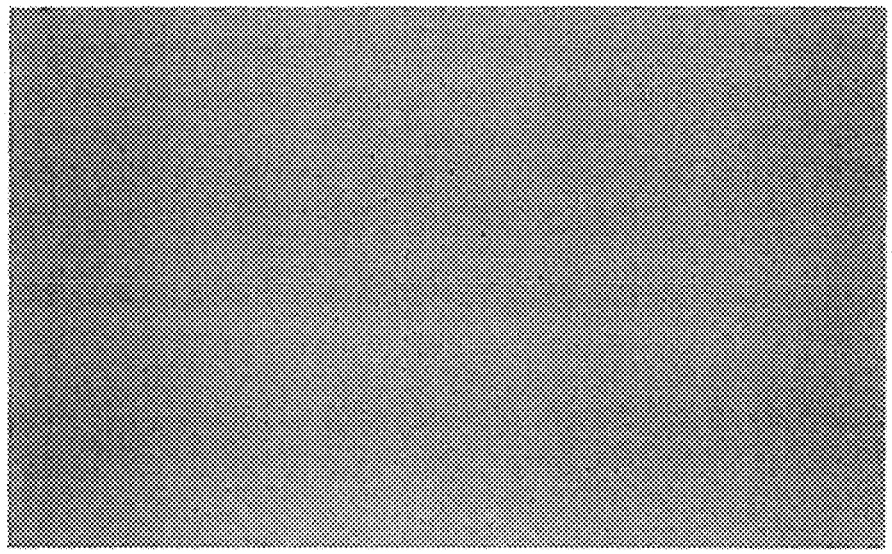
FIGS. 4A and 4B are examples of images captured for evaluating flow marks.
Figure 4B:
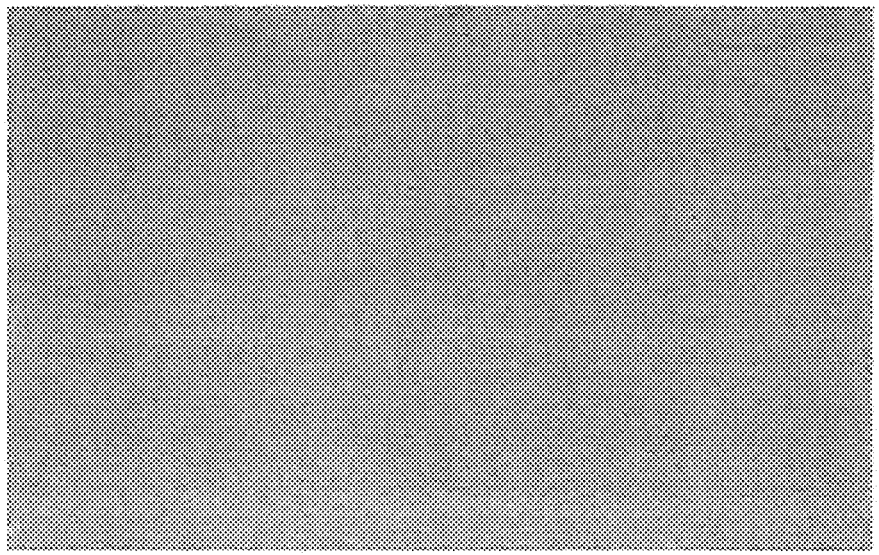
Figure 5:
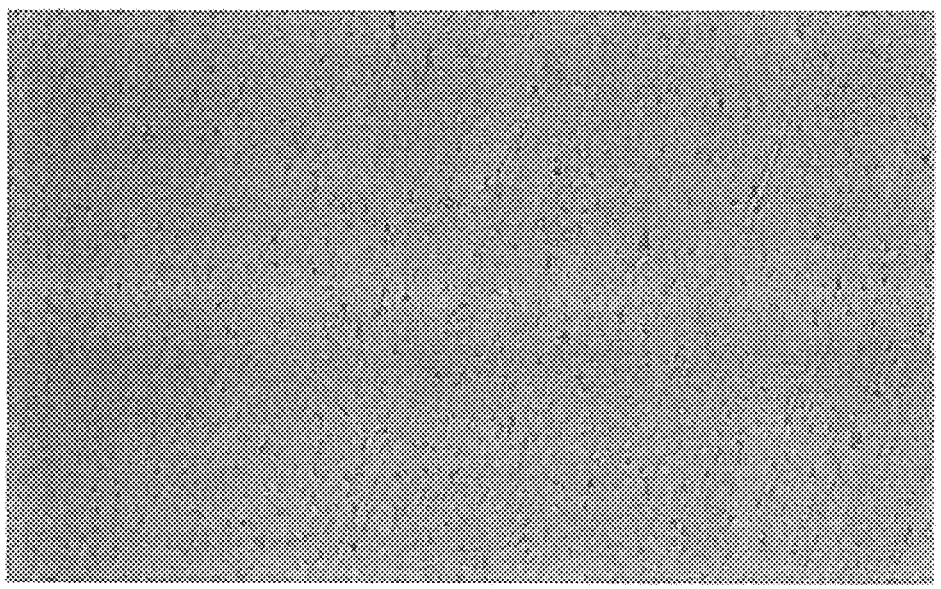
FIG. 5 is an example of an image captured for evaluating flow marks.
Figure 6A:
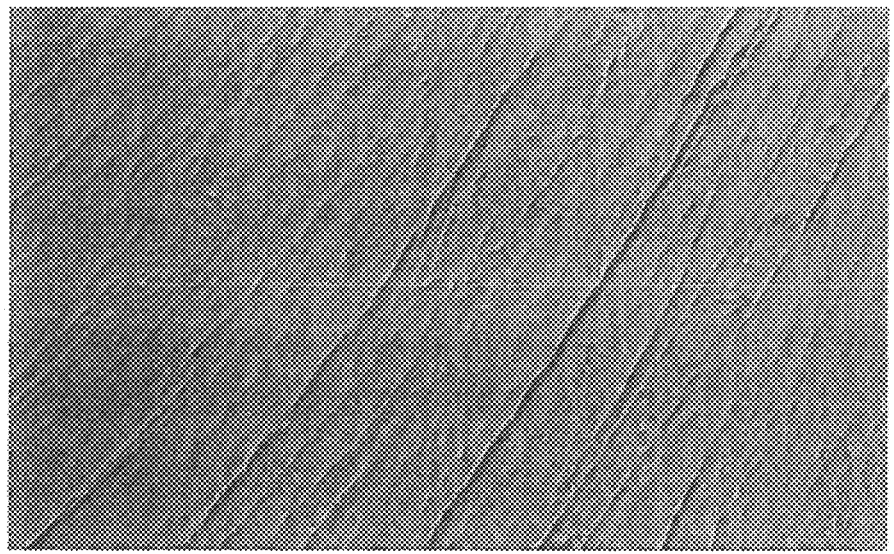
FIGS. 6A and 6B are examples of images captured for evaluating flow marks.
Figure 6B:
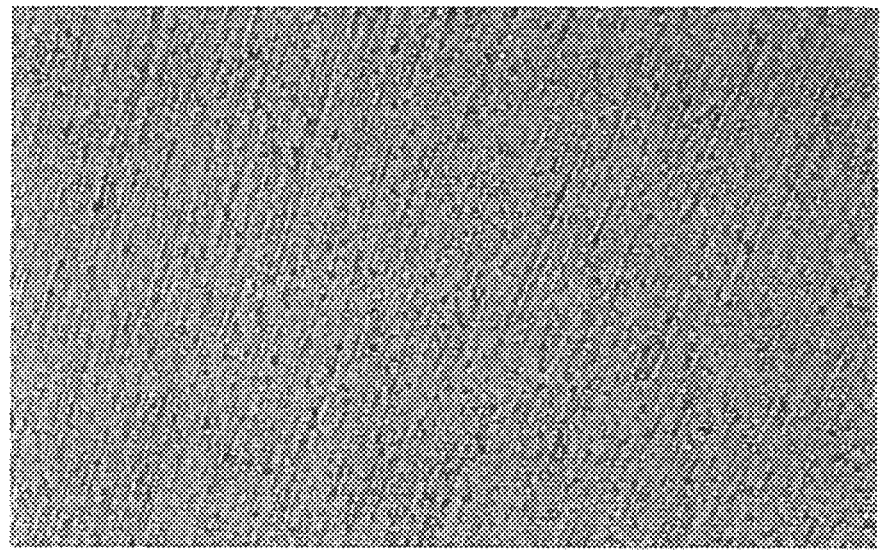

Examples of the captured images judged to be O are shown in FIGS. 4A and 4B, an example of the captured image judged to be A is shown in FIG. 5, and examples of the captured images judged to be X are shown in FIGS. 6A and 6B.

(4) Bending Rigidity

The laminated glass A, the laminated glass B, the laminated glass C, and the laminated glass G obtained as above were prepared. In the laminated glass A, the laminated glass B, the laminated glass C, and the laminated glass G, the following glass plates were used.

Laminated glass A: two glass plates (clear float glass, 25 cm (length)×10 cm (width)×2.5 mm (thickness))

Laminated glass B: one glass plate (clear float glass, 25 cm (length)×10 cm (width)×2.5 mm (thickness)) and one glass plate (Gorilla glass 2, 25 cm (length)×10 cm (width)× 0.7 mm (thickness))

Laminated glass C: two glass plates (Gorilla glass 2, 25 cm (length)×10 cm (width)×0.7 mm (thickness))

Laminated glass G: one glass plate (clear float glass, 25 cm (length)×10 cm (width)×1.8 mm (thickness)) and one glass plate (clear float glass, 25 cm (length)×10 cm (width)× 1.0 mm (thickness))

Figure 3:
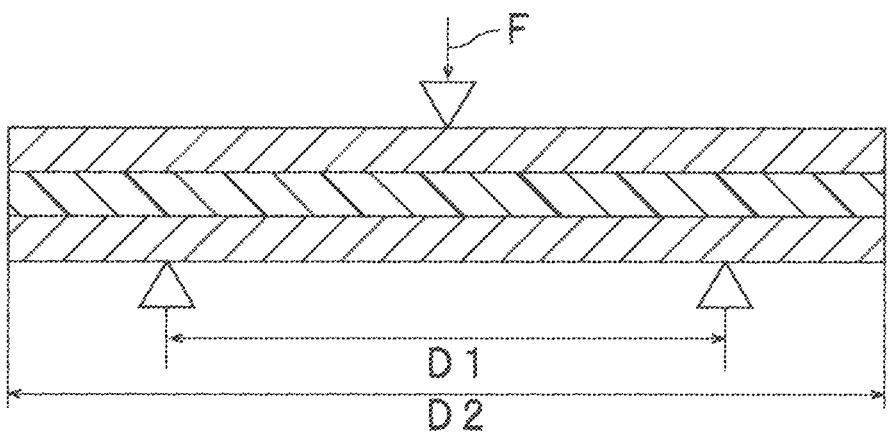
FIG. 3 is a schematic view for illustrating a method for measuring bending rigidity.

By a testing method schematically illustrated in FIG. 3, bending rigidity was evaluated. As a measurement device, a universal material testing machine 5966 manufactured by Instron Japan Company Ltd. including a static 3-point bending test jig 2810 was used. Under the measurement conditions of a measurement temperature of 20±3° C., a distance D1 of 18 cm, and a distance D2 of 25 cm, the laminated glass was distorted in an F direction at a displacement rate of 1 mm/min, a stress at the time when a displacement of 1.5 mm was applied thereto was measured, and bending rigidity was calculated.

(5) Sound Insulating Properties

The laminated glass D was vibrated by a vibration generator ("vibrator G21-005D" manufactured by Shinken Co., Ltd.) for a damping test, and vibration characteristics obtained from the laminated glass D were amplified using a mechanical impedance analyzer ("XG-81" manufactured by RION Co., Ltd.), and a vibration spectrum thereof was analyzed using a FFT spectrum analyzer ("FFT analyzer HP3582A" manufactured by Yokogawa Hewlett-Packard, Ltd.).

From a ratio of a loss factor obtained as above to a resonant frequency of the laminated glass, a graph showing a relationship between a sound frequency (Hz) and an acoustic transmission loss (dB) at 20° C. was plotted, and a minimum acoustic transmission loss (TL value) at around a sound frequency of 2,000 Hz was determined. The greater the TL value, the better the sound insulating properties. The sound insulating properties were judged based on the following criteria.

[Criteria for Judging Sound Insulating Properties]

O: A TL value was 35 dB or greater.

×: A TL value was less than 35 dB.

(6) Visible light transmittance (A light, Y value, initial A-Y (380 to 780 nm))

BY using a spectrophotometer ("U-4100" manufactured by Hitachi High-Technologies Corporation.), a visible light transmittance of the obtained laminated glass E at a wavelength of 380 to 780 nm was measured based on JIS R3211 (1998). The visible light transmittance was judged based on the following criteria.

[Criteria for Judging Visible Light Transmittance]

O: A visible light transmittance was 70% or greater.

×: A visible light transmittance was less than 70%.

Details and results of the above tests are shown in the following Tables 1 to 4. In the following Tables 1 to 4, formulated components other than the polyvinyl acetal resin, the plasticizer, and the silica particles are not described.

TABLE 1

|  |  |  |  | Example 1 | Example 2 | Example 3 | Comparative Example 1 | Comparative Example 4 | Comparative Example 2 |
|---|---|---|---|---|---|---|---|---|---|
| Composition of first layer | Polyvinyl acetal resin | Thickness | μm | 100 | 100 | 100 | 100 | 60 | 60 |
|  |  | Average degree of polymerization of PVA |  | 1700 | 3000 | 1700 | 2500 | 1700 | 2500 |

TABLE 1-continued

|  |  |  |  | Example 1 | Example 2 | Example 3 | Comparative Example 1 | Comparative Example 4 | Comparative Example 2 |
|---|---|---|---|---|---|---|---|---|---|
|  |  | Content ratio of hydroxyl group | Mol % | 21.2 | 23.3 | 21.2 | 20.8 | 21.2 | 20.8 |
|  |  | Degree of acetylation | Mol % | 12.6 | 12.0 | 12.6 | 23.5 | 12.6 | 23.5 |
|  |  | Degree of acetalization | Mol % | 66.3 | 64.7 | 66.3 | 55.7 | 66.3 | 55.7 |
|  |  | Content | Part by weight | 100 | 100 | 100 | 100 | 100 | 100 |
|  | Plasticizer | Type |  | 3GO | 3GO | 3GO | 3GO | 3GO | 3GO |
|  |  | Content | Part by weight | 60 | 60 | 60 | 60 | 60 | 60 |
|  | Silica particles | Type |  | a | a | b | a | a | a |
|  |  | Content | Part by weight | 20 | 5 | 20 | 20 | 20 | 20 |
|  | Glass transition temperature |  | ° C. | −0.15 | 2.11 | −0.25 | −1.57 | −0.18 | −1.52 |
|  | tanδ at 200° C. |  |  | 1.67 | 0.90 | 2.50 | 0.77 | 1.65 | 0.76 |
| Composition of second and third layers | Thickness of each layer |  | μm | 340 | 340 | 340 | 340 | 360 | 360 |
|  | Polyvinyl acetal resin | Average degree of polymerization of PVA |  | 1700 | 1700 | 1700 | 1700 | 1700 | 1700 |
|  |  | Content ratio of hydroxyl group | Mol % | 34.5 | 30.1 | 34.5 | 34.5 | 34.5 | 34.5 |
|  |  | Degree of acetylation | Mol % | 0.8 | 0.8 | 0.8 | 0.8 | 0.8 | 0.8 |
|  |  | Degree of acetalization | Mol % | 64.7 | 69.1 | 64.7 | 64.7 | 64.7 | 64.7 |
|  |  | Content | Part by weight | 100 | 100 | 100 | 100 | 100 | 100 |
|  | Plasticizer | Type |  | 3GO | 3GO | 3GO | 3GO | 3GO | 3GO |
|  |  | Content | Part by weight | 24 | 38.5 | 24 | 24 | 24 | 24 |
|  | Glass transition temperature |  | ° C. | 44.8 | 28.7 | 43.8 | 44.0 | 44.5 | 43.5 |
| Evaluation | Flow mark |  |  | ○ | ○ | ○ | X | ○ | X |
|  | Bending rigidity | Laminated glass A | mm/N | 0.0034 | 0.0058 | 0.0043 | 0.0035 | 0.0033 | 0.0031 |
|  |  | Laminated glass B | mm/N | 0.0074 | 0.0109 | 0.0080 | 0.0073 | 0.0063 | 0.0064 |
|  |  | Laminated glass C | mm/N | 0.0465 | 0.0895 | 0.0532 | 0.0458 | 0.0353 | 0.0352 |
|  |  | Laminated glass G | mm/N | 0.0110 | 0.0179 | 0.0120 | 0.0109 | 0.0092 | 0.0091 |
|  | Sound insulating properties: TL method |  |  | ○ | ○ | ○ | ○ | ○ | ○ |
|  | Visible light transmittance |  |  | ○ | ○ | ○ | ○ | ○ | ○ |

TABLE 2

|  |  |  |  | Example 5 | Example 6 | Example 7 | Example 8 | Example 9 | Example 10 | Example 11 | Example 12 |
|---|---|---|---|---|---|---|---|---|---|---|---|
| Composition of first layer | Thickness |  | μm | 100 | 100 | 100 | 100 | 100 | 100 | 100 | 100 |
|  | Polyvinyl acetal resin | Average degree of polymerization of PVA |  | 1700 | 1700 | 1700 | 1700 | 1700 | 1700 | 1700 | 1700 |
|  |  | Content ratio of hydroxyl group | Mol % | 23.1 | 23.1 | 23.1 | 23.1 | 21.2 | 23.1 | 23.1 | 23.1 |
|  |  | Degree of acetylation | Mol % | 12.5 | 12.5 | 12.5 | 12.5 | 12.6 | 12.5 | 12.5 | 12.5 |
|  |  | Degree of acetalization | Mol % | 64.5 | 64.5 | 64.5 | 64.5 | 66.2 | 64.5 | 64.5 | 64.5 |
|  |  | Content | Part by weight | 100 | 100 | 100 | 100 | 100 | 100 | 100 | 100 |
|  | Plasticizer | Type |  | 3GO | 3GO | 3GO | 3GO | 3GO | 3GO | 3GO | 3GO |
|  |  | content | Part by weight | 60 | 60 | 60 | 60 | 60 | 60 | 60 | 60 |
|  | Silica particles | Type |  | c | c | c | c | c | c | c | c |
|  |  | content | Part by weight | 20 | 20 | 20 | 20 | 20 | 20 | 20 | 20 |
|  | Glass transition temperature |  | ° C. | 2.13 | 2.13 | 2.13 | 2.13 | −0.12 | 2.13 | 2.13 | 2.13 |
|  | tanδ at 200° C. |  |  | 1.78 | 1.78 | 1.78 | 1.78 | 1.54 | 1.78 | 1.78 | 1.78 |
| Composition of second and third layers | Thickness of each layer |  | μm | 340 | 340 | 340 | 340 | 340 | 340 | 340 | 340 |
|  | Polyvinyl acetal resin | Average degree of polymerization of PVA |  | 1700 | 1700 | 1700 | 1700 | 1700 | 1700 | 1700 | 1700 |
|  |  | Content ratio of hydroxyl group | Mol % | 34.5 | 33.2 | 32.5 | 31.4 | 34.5 | 35.4 | 36.5 | 37.3 |
|  |  | Degree of acetylation | Mol % | 0.8 | 0.8 | 0.8 | 0.8 | 0.8 | 0.8 | 0.8 | 0.8 |

TABLE 2-continued

|  |  |  | | Example 5 | Example 6 | Example 7 | Example 8 | Example 9 | Example 10 | Example 11 | Example 12 |
|---|---|---|---|---|---|---|---|---|---|---|---|
|  |  | Degree of acetalization | Mol % | 64.7 | 66 | 66.7 | 67.8 | 64.7 | 63.8 | 62.7 | 61.9 |
|  |  | Content | Part by weight | 100 | 100 | 100 | 100 | 100 | 100 | 100 | 100 |
|  | Plasticizer | Type |  | 3GO | 3GO | 3GO | 3GO | 3GO | 3GO | 3GO | 3GO |
|  |  | content | Part by weight | 32 | 34.1 | 35.3 | 37.3 | 28.6 | 30.2 | 28.3 | 26.8 |
|  | Glass transition temperature |  | ° C. | 37.3 | 34.4 | 32.8 | 30.3 | 39.8 | 39.3 | 41.8 | 43.6 |
| Evaluation |  | Flow mark |  | ○ | ○ | ○ | ○ | ○ | ○ | ○ | ○ |
|  | Bending rigidity | Laminated glass A | mm/N | 0.0044 | 0.0044 | 0.0045 | 0.0047 | 0.0038 | 0.0041 | 0.0041 | 0.0040 |
|  |  | Laminated glass B | mm/N | 0.0086 | 0.0085 | 0.0087 | 0.0091 | 0.0077 | 0.0081 | 0.0081 | 0.0080 |
|  |  | Laminated glass C | mm/N | 0.0648 | 0.0613 | 0.0640 | 0.0702 | 0.0512 | 0.0570 | 0.0560 | 0.0556 |
|  |  | Laminated glass G | mm/N | 0.0139 | 0.0135 | 0.0140 | 0.0150 | 0.0118 | 0.0128 | 0.0127 | 0.0126 |
|  | Sound insulating properties: TL method |  |  | ○ | ○ | ○ | ○ | ○ | ○ | ○ | ○ |
|  | Visible light transmittance |  |  | ○ | ○ | ○ | ○ | ○ | ○ | ○ | ○ |

TABLE 3

|  |  |  |  | Example 13 | Example 14 | Example 15 | Example 16 | Example 17 | Example 18 | Example 19 | Example 20 |
|---|---|---|---|---|---|---|---|---|---|---|---|
| Composition of first layer | | Thickness | μm | 100 | 100 | 100 | 100 | 100 | 100 | 80 | 50 |
|  | Polyvinyl acetal resin | Average degree of polymerization of PVA |  | 1700 | 2300 | 1700 | 2300 | 1700 | 1700 | 1700 | 1700 |
|  |  | Content ratio of hydroxyl group | Mol % | 21.1 | 20.8 | 24.4 | 24.6 | 23.1 | 23.1 | 23.1 | 23.1 |
|  |  | Degree of acetylation | Mol % | 1.6 | 1.6 | 6.5 | 6.5 | 12.5 | 12.5 | 12.5 | 12.5 |
|  |  | Degree of acetalization | Mol % | 77.3 | 77.6 | 69.1 | 68.9 | 64.5 | 64.5 | 64.5 | 64.5 |
|  |  | Content | Part by weight | 100 | 100 | 100 | 100 | 100 | 100 | 100 | 100 |
|  | Plasticizer | Type |  | 3GO | 3GO | 3GO | 3GO | 3GO | 3GO | 3GO | 3GO |
|  |  | Content | Part by weight | 60 | 60 | 60 | 60 | 50 | 80 | 60 | 60 |
|  | Silica particles | Type |  | c | c | c | c | c | c | c | c |
|  |  | Content | Part by weight | 20 | 20 | 20 | 20 | 20 | 20 | 20 | 20 |
|  | Glass transition temperature |  | ° C. | 3.87 | 3.74 | 5.42 | 5.54 | 6.04 | −5.32 | 2.13 | 2.13 |
|  | tanδ at 200° C. |  |  | 1.63 | 1.05 | 1.74 | 1.02 | 1.62 | 2.12 | 1.78 | 1.78 |
| Composition of second and third layers | | Thickness of each layer | μm | 340 | 340 | 340 | 340 | 340 | 340 | 350 | 365 |
|  | Polyvinyl acetal resin | Average degree of polymerization of PVA |  | 1700 | 1700 | 1700 | 1700 | 1700 | 1700 | 1700 | 1700 |
|  |  | Content ratio of hydroxyl group | Mol % | 34.5 | 34.5 | 34.5 | 34.5 | 34.5 | 34.5 | 34.5 | 34.5 |
|  |  | Degree of acetylation | Mol % | 0.8 | 0.8 | 0.8 | 0.8 | 0.8 | 0.8 | 0.8 | 0.8 |
|  |  | Degree of acetalization | Mol % | 64.7 | 64.7 | 64.7 | 64.7 | 64.7 | 64.7 | 64.7 | 64.7 |
|  |  | Content | Part by weight | 100 | 100 | 100 | 100 | 100 | 100 | 100 | 100 |
|  | Plasticizer | Type |  | 3GO | 3GO | 3GO | 3GO | 3GO | 3GO | 3 GO | 3GO |
|  |  | Content | Part by weight | 31 | 31 | 36 | 36 | 33 | 30 | 32 | 32 |
|  | Glass transition temperature |  | ° C. | 39.9 | 40.3 | 35.6 | 35.3 | 37.3 | 37.3 | 37.3 | 37.3 |
| Evaluation |  | Flow mark |  | ○ | ○ | ○ | ○ | ○ | ○ | ○ | ○ |
|  | Bending rigidity | Laminated glass A | mm/N | 0.0040 | 0.0039 | 0.0040 | 0.0041 | 0.0035 | 0.0048 | 0.0042 | 0.0038 |
|  |  | Laminated glass B | mm/N | 0.0079 | 0.0079 | 0.0080 | 0.0081 | 0.0073 | 0.0092 | 0.0083 | 0.0076 |
|  |  | Laminated glass C | mm/N | 0.0544 | 0.0537 | 0.0547 | 0.0569 | 0.0458 | 0.0731 | 0.0604 | 0.0511 |
|  |  | Laminated glass G | mm/N | 0.0124 | 0.0123 | 0.0124 | 0.0128 | 0.0109 | 0.0152 | 0.0132 | 0.0117 |
|  | Sound insulating properties: TL method |  |  | ○ | ○ | ○ | ○ | ○ | ○ | ○ | ○ |
|  | Visible light transmittance |  |  | ○ | ○ | ○ | ○ | ○ | ○ | ○ | ○ |

TABLE 4

|  |  |  |  | Example 21 | Example 22 | Example 23 | Example 24 | Example 25 | Comparative Example 3 | Example 26 |
|---|---|---|---|---|---|---|---|---|---|---|
| Composition of first layer | Polyvinyl acetal resin | Thickness | μm | 120 | 120 | 120 | 70 | 100 | 100 | 100 |
|  |  | Average degree of polymerization of PVA |  | 1700 | 1700 | 1700 | 1700 | 1700 | 1700 | 1700 |
|  |  | Content ratio of hydroxyl group | Mol % | 24.6 | 24.6 | 24.6 | 23.4 | 23.1 | 23.1 | 27.5 |
|  |  | Degree of acetylation | Mol % | 14 | 14 | 14 | 13.3 | 12.5 | 12.5 | 12.5 |
|  |  | Degree of acetalization | Mol % | 61.4 | 61.4 | 61.4 | 63.3 | 64.5 | 64.5 | 60 |
|  |  | Content | Part by weight | 100 | 100 | 100 | 100 | 100 | 100 | 100 |
|  | Plasticizer | Type |  | 3GO | 3GO | 3GO | 3GO | 3GO | 3GO | DBEA |
|  |  | Content | Part by weight | 60 | 60 | 60 | 60 | 60 | 60 | 60 |
|  | Silica particles | Type |  | d | d | d | d | c | c | c |
|  |  | Content | Part by weight | 20 | 20 | 20 | 20 | 30 | 40 | 20 |
|  | Glass transition temperature |  | °C. | 3.42 | 3.42 | 3.42 | 2.03 | 2.36 | 2.58 | 0.34 |
|  | tan δ at 200° C. |  |  | 1.68 | 1.68 | 1.68 | 1.55 | 0.82 | 0.65 | 1.66 |
| Composition of second and third layers | Thickness of each layer |  | μm | 330 | 330 | 330 | 355 | 340 | 340 | 340 |
|  | Polyvinyl acetal resin | Average degree of polymerization of PVA |  | 1700 | 1700 | 1700 | 1700 | 1700 | 1700 | 1700 |
|  |  | Content ratio of hydroxyl group | Mol % | 34.5 | 34.5 | 34.5 | 34.5 | 34.5 | 34.5 | 34.5 |
|  |  | Degree of acetylation | Mol % | 0.8 | 0.8 | 0.8 | 0.8 | 0.8 | 0.8 | 0.8 |
|  |  | Degree of acetalization | Mol % | 64.7 | 64.7 | 64.7 | 64.7 | 64.7 | 64.7 | 64.7 |
|  |  | Content | Part by weight | 100 | 100 | 100 | 100 | 100 | 100 | 100 |
|  | Plasticizer | Type |  | 3GO | 3GO | 3GO | 3GO | 3GO | 3GO | DBEA |
|  |  | Content | Part by weight | 31 | 33 | 35 | 32 | 32 | 32 | 38.5 |
|  | Glass transition temperature |  | °C. | 36.4 | 35.3 | 34.0 | 36.9 | 37.3 | 37.3 | 31.5 |
| Evaluation | Flow mark |  |  | ○ | ○ | ○ | ○ | ○ | X | ○ |
|  | Bending rigidity | Laminated glass A | mm/N | 0.0039 | 0.0043 | 0.0044 | 0.0037 | 0.0035 | 0.0031 | 0.0046 |
|  |  | Laminated glass B | mm/N | 0.0081 | 0.0084 | 0.0087 | 0.0075 | 0.0082 | 0.0076 | 0.0069 |
|  |  | Laminated glass C | mm/N | 0.0579 | 0.0617 | 0.0667 | 0.0486 | 0.0575 | 0.0508 | 0.0677 |
|  |  | Laminated glass G | mm/N | 0.0128 | 0.0134 | 0.0142 | 0.0113 | 0.0129 | 0.0117 | 0.0146 |
|  | Sound insulating properties: TL method |  |  | ○ | ○ | ○ | ○ | ○ | ○ | ○ |
|  | visible light transmittance |  |  | ○ | ○ | ○ | ○ | ○ | ○ | ○ |

REFERENCE SIGNS LIST

1 . . . first layer
1a . . . first surface
1b . . . second surface
2 . . . second layer
2a . . . surface facing outside
3 . . . third layer
3a . . . surface facing outside
11 . . . interlayer film
11a . . . first surface
11b . . . second surface
21 . . . first lamination glass member
22 . . . second lamination glass member
31 . . . laminated glass Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An interlayer film for laminated glass comprising:
a first layer containing a thermoplastic resin, a plasticizer, and silica particles;
a second layer containing a thermoplastic resin, and
a third layer containing a thermoplastic resin,
wherein the second layer is disposed on a first surface side of the first layer, and the third layer is disposed on a second surface side of the first layer that is opposite to the first surface,
wherein the thermoplastic resin in the first layer is a polyvinyl acetal resin,
wherein a degree of acetylation of the polyvinyl acetal resin in the first layer is 25 mol % or less,
wherein a content of the plasticizer in the first layer is 50 parts by weight to 100 parts by weight with respect to 100 parts by weight of the thermoplastic resin in the first layer,
wherein a content of the silica particles in the first layer is 5 parts by weight to 35 parts by weight with respect to 100 parts by weight of the thermoplastic resin in the first layer,
wherein the first layer has tan δ of 0.8 or greater at 200° C.,
wherein the second layer has a glass transition temperature higher than a glass transition temperature of the first layer, and wherein the glass transition temperature of the first layer is 15° C. or lower.

2. The interlayer film for laminated glass according to claim 1,
wherein a concentration of hydroxyl groups of the polyvinyl acetal resin in the first layer is 28 mol % or less.

3. The interlayer film for laminated glass according to claim 1,
wherein the thermoplastic resin in the second layer is a polyvinyl acetal resin.

4. The interlayer film for laminated glass according to claim 1,
wherein an absolute value of a difference between the glass transition temperature of the first layer and the glass transition temperature of the second layer is 30° C. or higher.

5. The interlayer film for laminated glass according to claim 1,
wherein each of the second layer and the third layer contains a plasticizer.

6. The interlayer film for laminated glass according to claim 1,
wherein provided that a thickness of the interlayer film for laminated glass is T, a thickness of the first layer is 0.4T or less.

7. The interlayer film for laminated glass according to claim 1,
wherein a thickness of the first layer is 200 μm or less.

8. The interlayer film for laminated glass according to claim 1,
wherein when laminated glass is obtained by interposing the interlayer film for laminated glass between two sheets of green glass having a thickness of 2 mm based on JIS R3208, a visible light transmittance of the obtained laminated glass is 70% or greater.

9. The interlayer film for laminated glass according to claim 1, wherein the interlayer film is used with a first glass plate with a thickness equal to or less than 1 mm and is arranged between the first glass plate and a second glass plate for obtaining laminated glass.

10. A laminated glass comprising:
a first lamination glass member;
a second lamination glass member; and
the interlayer film for laminated glass according to claim 1,
wherein the interlayer film for laminated glass is disposed between the first lamination glass member and the second lamination glass member.

11. The laminated glass according to claim 10,
wherein the first lamination glass member is a first glass plate, and
a thickness of the first glass plate is 1 mm or less.

12. The interlayer film for laminated glass according to claim 1,
wherein an absolute value of a difference between the glass transition temperature of the first layer and the glass transition temperature of the second layer is 20° C. or higher.

13. The interlayer film for laminated glass according to claim 1,
wherein the polyvinyl acetal resin in the first layer is an acetalization product of polyvinyl alcohol having an average degree of polymerization of 1,500 or greater.

* * * * *